United States Patent
Henderson et al.

(10) Patent No.: US 6,724,870 B1
(45) Date of Patent: Apr. 20, 2004

(54) SYSTEM AND METHOD FOR DISTRIBUTING ENHANCED TELEPHONY SERVICE TO CUSTOMER PREMISES EQUIPMENT

(75) Inventors: Michael P. Henderson, Tustin, CA (US); Sverrir Olafsson, Reykjavik (IS)

(73) Assignee: Mindspeed Technologies, Inc., Newport Beach, CA (US)

( * ) Notice: Subject to any disclaimer, the term of this patent is extended or adjusted under 35 U.S.C. 154(b) by 0 days.

(21) Appl. No.: 10/328,830

(22) Filed: Dec. 24, 2002

Related U.S. Application Data

(62) Division of application No. 09/337,459, filed on Jun. 21, 1999, now Pat. No. 6,546,098.

(51) Int. Cl.⁷ .................. H04M 11/00; H04M 1/66
(52) U.S. Cl. ............... 379/93.02; 379/93.05; 379/199; 379/413.03
(58) Field of Search ............. 379/93.02, 93.05, 379/199, 93.08, 211.04, 229, 413.04, 383, 386, 413.03; 370/352; 375/231

(56) References Cited

U.S. PATENT DOCUMENTS

| | | | | |
|---|---|---|---|---|
| 4,776,006 A | | 10/1988 | Comerford et al. ......... 379/159 |
| 5,692,039 A | * | 11/1997 | Brankley et al. ........... 379/229 |
| 5,802,160 A | * | 9/1998 | Kugell et al. .......... 379/211.04 |
| 5,899,774 A | | 5/1999 | Sexton ....................... 439/652 |
| 5,903,643 A | * | 5/1999 | Bruhnke ................ 379/413.04 |
| 5,930,340 A | * | 7/1999 | Bell ......................... 379/93.08 |
| 6,208,637 B1 | * | 3/2001 | Eames ........................ 370/352 |
| 6,263,063 B1 | * | 7/2001 | Bansal et al. ............... 379/164 |
| 6,310,894 B1 | | 10/2001 | Counterman ................ 370/484 |
| 6,445,733 B1 | * | 9/2002 | Zuranski et al. ............ 375/231 |
| 6,486,975 B1 | * | 11/2002 | Verreault et al. ........... 358/445 |

* cited by examiner

*Primary Examiner*—Benny Tieu
(74) *Attorney, Agent, or Firm*—Farjami & Farjami LLP

(57) ABSTRACT

A telephony services distribution system includes a voice/data server that receives and transmits telephony data in accordance with a suitable digital communication protocol. The voice/data server is associated with a customer premise that supports a number of enhanced telephony devices, which may include wired and/or wireless telephone devices, videophone devices, facsimile devices, or the like. The customer premise may also support any number of conventional POTS telephony instruments. The voice/data server and the enhanced telephony devices communicate signaling data therebetween via a signaling technique such as the V.21 modem protocol. The signaling information conveys data associated with the status of the enhanced telephony devices, calling party and called party identification, characteristics of the incoming and outgoing calls, and/or data related to any number of operating parameters and characteristics of the system. The telephony services distribution system enables a single twisted pair to support calls associated with a plurality of telephone numbers and a plurality of enhanced telephony instruments to receive calls associated with different telephone numbers. The system is capable of regulating, monitoring, and controlling communications in response to a called party identification or a calling party identification.

21 Claims, 9 Drawing Sheets

SYSTEM AND METHOD FOR DISTRIBUTING ENHANCED TELEPHONY SERVICE TO CUSTOMER PREMISES EQUIPMENT

The present application is a divisional of U.S. Ser. No. 09/337,459, filed on Jun. 21, 1999, now U.S. Pat. No. 6,546,098.

FIELD OF THE INVENTION

The present invention relates generally to telecommunication systems that provide telephony services to consumers. More particularly, the present invention relates to techniques for the distribution of enhanced telecommunication services to consumers over the currently existing wiring infrastructure associated with the customer premises.

BACKGROUND OF THE INVENTION

A number of data communication techniques may be utilized to provide high-speed digital data to consumers. Such digital data may be associated with telephone, facsimile machine, video, audio, internet, and other applications. In contrast to the traditional (4 kHz bandwidth) telephone transmission system, digital data can be used to convey a large amount of information in an efficient and accurate manner. Such digital data may be transmitted at high bit rates in accordance with any number of conventional methods and protocols, e.g., cable modem technology, fiber optic networks, ADSL modem technology, ISDN technology, wireless digital modem technology, and the like.

Although high speed digital transmission systems are becoming increasingly popular for applications such as cable television and personal computers, they have not been fully exploited to provide enhanced telephony services to customer premises that are wired to support plain old telephone service ("POTS") transmissions. Indeed, the focus of many telephony service providers (and cable service providers who provide internet access) has been limited to the delivery of high speed digital data to the customer premises; the manner in which the telephony services are to be distributed within the customer premises has not been given much attention. Enhanced telephony services may include any number of features that are either difficult or impossible to implement in many practical situations: multiple phone numbers supported by a single twisted pair; selective ringing of telephone devices supported by a single twisted pair; and the regulation of incoming and outgoing call traffic according to available wiring resources.

One currently proposed high speed digital telephony system is schematically depicted in FIG. 1. In accordance with conventional twisted pair telephone wiring schemes, a customer site 100 (a home, a building, or the like) includes two twisted pairs 102, 104 configured to support telephony services. For the sake of clarity, twisted pair 102 is depicted as a solid line and twisted pair 104 is depicted as a dashed line. Customer site 100 may include a number of standard RJ-11 telephone jacks 106, 108, 110 that are compatible with telephone plugs associated with the customer premises equipment. In FIG. 1, jack 106 and jack 108 are electrically connected together by twisted pair 102 such that a first telephone 112 and a second telephone 114 receive and place calls on twisted pair 102, which is specifically devoted to supporting first telephone 112 and second telephone 114. Twisted pair 104 and jack 110 are devoted to supporting a fax machine 116.

Customer site 100 has a network interface device ("NID") 120 associated therewith. NID 120 is located proximate the physical structure of customer site 100. In a conventional POTS scheme, the local telephone company provides the 4 kHz telephony service to NID 120 via any number of switching stations, central offices, and the like. In contrast, the high speed digital telephony system shown in FIG. 1 is configured such that NID 120 obtains input signals from a digital interface 122, which in turn receives digital data 123 in accordance with a conventional digital data transmission technique. Digital interface 122 transforms the digital data 123 into analog signals that are transmitted to NID 120. These analog signals are equivalent to the analog signals produced by a conventional POTS technique. In other words, once the digital data is received and converted into the analog signals, the telephony service and the distribution of calls are handled in a conventional POTS manner. Consequently, the availability of high speed digital data cannot be fully exploited by this prior art system due to the practical limitations of the existing POTS wiring and the existing POTS telephony distribution scheme.

Although a number of theoretical solutions may be capable of providing enhanced telephony services once a high speed digital link is established, such solutions would be impractical and/or too costly to implement. For example, a truly practical solution should leverage as much of the existing customer premises wiring as possible. A requirement of new or re-routed wires, outlets, junction boxes, and the like would make any new distribution solution unattractive to the end user and expensive to implement by the service provider. In addition, consumers may be reluctant to implement a new telephony paradigm if doing so would require them to abandon their familiar POTS telephones. Furthermore, in contrast to a substantial change in the operation of telephone services, a gradual introduction of enhanced services, based on actual demand, would meet less resistance from consumers.

SUMMARY OF THE INVENTION

The present invention provides improved techniques for providing telephony services to the customer premises. The improved telephony techniques enable enhanced services to be efficiently distributed within the customer premises without having to overhaul the existing telephone wiring infrastructure associated with the premises. A telephony system in accordance with the present invention can support a plurality of telephone numbers even though the customer premises may be wired with only a single twisted pair.

A smooth transition from the traditional POTS paradigm to an enhanced telephony system according to the present invention is possible because the enhanced system can be made fully compatible with legacy telephony equipment. In accordance with the present invention, the operating procedures associated with the enhanced system (e.g., placing calls, joining a call with an extension telephone, dialing, and the like) are identical or substantially similar to the procedures associated with the POTS scheme, thus preserving the familiar operating protocols known to consumers. Furthermore, consumers may be given the opportunity to gradually take advantage of enhanced services and additional features to suit their needs and/or budgets.

The above and other features of the present invention may be carried out in one form by a method for distributing telephony services to a plurality of telephony devices corresponding to a plurality of telephone numbers, where the plurality of telephony devices are operatively connected to a common twisted pair. The method involves the steps of receiving a digital signal that conveys telephony data associated with an incoming call, obtaining a called party identifier from the digital signal, and performing a signaling procedure in response to the called party identifier. The signaling procedure transmits ring information to at least one of the telephony devices.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION OF PREFERRED EMBODIMENTS OF THE INVENTION

The present invention may be described herein in terms of functional block components and various processing steps. It should be appreciated that such functional blocks may be realized by any number of hardware components configured to perform the specified functions. For example, the present invention may employ various integrated circuit components, e.g., memory elements, digital signal processing elements, logic elements, look-up tables, and the like, which may carry out a variety of functions under the control of one or more microprocessors or other control devices. In addition, those skilled in the art will appreciate that the present invention may be practiced in conjunction with any number of data transmission protocols and that the system described herein is merely one exemplary application for the invention. Further, it should be noted that the present invention may employ any number of conventional techniques for data transmission, signaling, data processing, network control, and the like. Such general techniques that may be known to those skilled in the art are not described in detail herein.

It should be appreciated that the particular implementations shown and described herein are merely exemplary and are not intended to limit the scope of the present invention in any way. Indeed, for the sake of brevity, conventional signal processing, data transmission, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

The operation of the plain old telephone service ("POTS") network is well known to those skilled in the telecommunication art. The POTS system is a circuit switched network that establishes point-to-point connections between end devices. The public switched telephone network ("PSTN") is associated with a number of switching circuits, local switching offices (i.e., central offices), and miles of telecommunication cables. A typical telephone signal transmitted over the PSTN eventually arrives at the customer site by way of an analog local loop. The signal is typically routed to a network interface device ("NID"), which serves as a demarcation between the PSTN and the customer premises. In the context of this description, "customer premises" may be a single family home, a multiple family building such as an apartment complex, an office building, or the like. However, for the sake of convenience, the description of the various embodiments of the present invention will refer to the telephone wiring and equipment within a single house.

Figure 1:
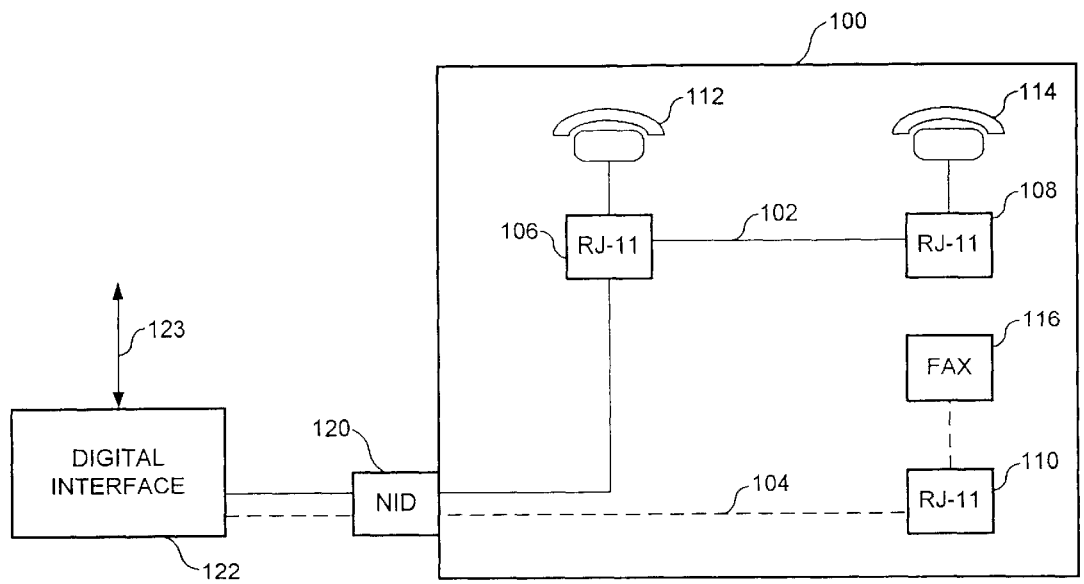
FIG. 1 is a schematic representation of a conventional customer site compatible with a prior art high speed digital data transmission protocol.

The vast majority of homes, particularly older homes, are wired with a limited number of twisted pair lines routed within the walls, basements, attic space, etc. Indeed, many old houses are wired to support only one telephone line (often with only one telephone jack in the entire house). Telephone jacks, such as RJ-11 jacks, are usually hard wired such that one twisted pair supports a single telecommunication line or circuit. Currently, RJ-11 jacks are configured to terminate only three twisted pairs (six wires). Consequently, in accordance with the conventional POTS scheme. a single RJ-11 jack can at best support three telephones and/or fax machines in a simultaneous manner, assuming that the RJ-11 jack is appropriately re-wired and that a suitable three-way splitter is employed. As shown in FIG. 1, the twisted pair connected to fax machine 116 does not support a telephone. Accordingly, twisted pair 104 represents wasted resources if fax machine 116 is only used in a sporadic manner. In addition, the conventional system shown in FIG. 1 is only capable of supporting two different telephone numbers: one associated with twisted pair 102 and one associated with twisted pair 104. If additional telephone numbers are desired, then additional twisted pairs, jacks, and telephone devices would be required.

The present invention provides techniques for distributing telephony services to a customer site in a manner that takes advantage of the availability of high speed digital data transmission systems. As described above in connection with FIG. 1, a number of conventional techniques such as fiber optic transmission, DSL modems, and ISDN may be employed to provide digital telephony information to the customer premises, to a local digital loop carrier ("DLC"), or to the local central office associated with the customer premises. Nonetheless, prior art telephony systems have yet to fully exploit the potential of high speed digital data transmissions because of the limitations of the wiring architecture at the customer site and the use of the 4 kHz POTS scheme.

Enhanced "4 kHz" Embodiment

Figure 2:
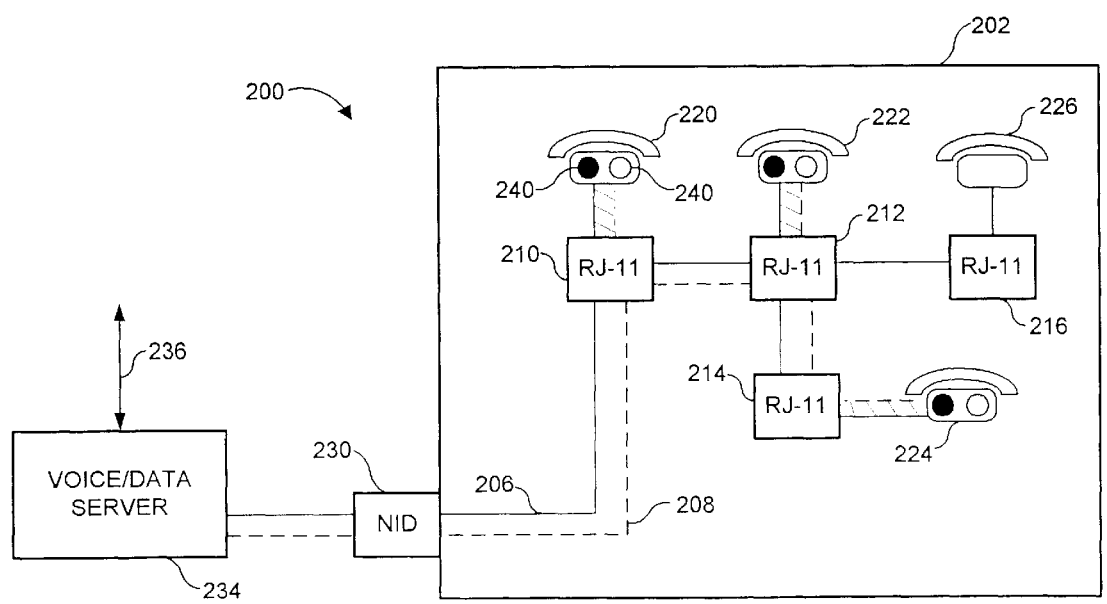
FIG. 2 is a schematic representation of a customer site in accordance with a first embodiment of the present invention.

FIG. 2 is a schematic representation of a telephony services distribution system 200 configured in accordance with a first embodiment of the present invention. System 200 is described herein in the context of a house 202 that is wired substantially in accordance with the existing POTS twisted pair wiring scheme. For the sake of convenience and clarity, house 202 is shown having only two twisted pairs: a first twisted pair 206 (represented by the solid line) and a second twisted pair 208 (represented by the dashed line). Notably, the physical layout and number of wires associated with house 202 need not substantially differ from a conventional POTS architecture that is designed to support two telephones with two dedicated twisted pairs. In a conventional POTS arrangement, each of the twisted pairs 206, 208 may be physically connected to any number of RJ-11 jacks (identified by reference numbers 210, 212, 214, and 216) even though each individual jack usually only terminates one of the two twisted pairs 206, 208. However, in the embodiment depicted in FIG. 2, jacks 210, 212, and 214 are configured such that both of the twisted pairs 206, 208 are terminated. In other words, each of jacks 210, 212, and 214 provide electrical connectivity to a plurality of twisted pairs rather than to a single twisted pair. For the sake of comparison, jack 216 is only connected to twisted pair 206.

Any number of enhanced telephones 220, 222, 224 may be utilized in system 200 (only three are shown for exemplary purposes). In addition, any number of conventional POTS telephones 226 may be utilized in a wholly compatible manner with enhanced telephones 220, 222, 224. Each of the enhanced telephones 220, 222, 224 is configured such that it can support a plurality of distinct telephone lines, e.g., a plurality of twisted pairs. In contrast to conventional telephone 226, enhanced telephones 220, 222, 224 are capable of receiving signals via twisted pair 206 and/or twisted pair 208. Accordingly, in the exemplary embodiment shown in FIG. 2, jacks 210, 212, 214 are each wired for connectivity with both twisted pairs 206, 208, and enhanced telephones 220, 222, 224 are each wired for connectivity with both twisted pairs 206, 208 (via an appropriate connecting cable between the enhanced telephones and the corresponding jacks). As described in more detail below, system 200 may be alternatively configured for compatibility with a customer site having only a single twisted pair.

Figure 3:
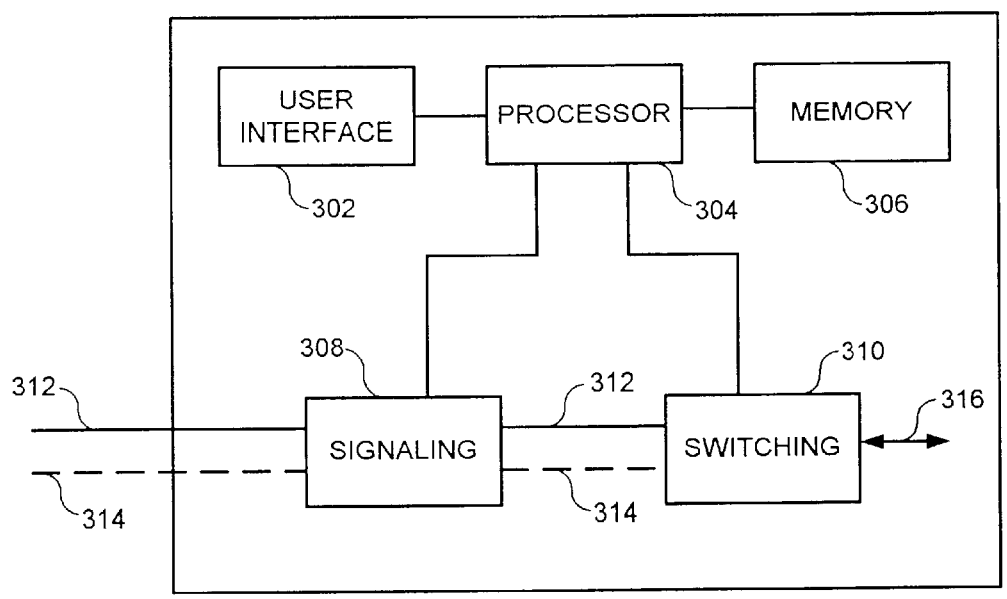
FIG. 3 is a block diagram representation of an exemplary enhanced telephone device configured in accordance with the present invention.

FIG. 3 is a block diagram representation of an enhanced telephone 300. Each of the enhanced telephones 220, 222, 224 may be configured in a similar manner. Enhanced telephone 300 includes a user interface 302 that may employ any number of conventional components to enable a user to input data and to provide information to the user. For example, user interface 302 may include a number of buttons, switches, indicators, or displays for identifying the status of the line (or lines) associated with enhanced telephone 300, for selecting a line to initiate or join a call, for dialing, and the like. Enhanced telephone 300 also utilizes a processor 304 and a memory element 306, which are respectively configured in accordance with conventional microprocessing and data storage techniques. Processor 304 (and other operating components of enhanced telephone 300) obtains DC line voltage in a conventional manner. Processor 304 and memory element 306 may be configured to enable enhanced telephone 300 to carry out any number of processes common to conventional telephone devices, such as memory dialing and conference calling. In addition, processor 304 and memory element 306 are configured in accordance with the enhanced procedures described herein. Although not depicted as Such in FIG. 3, enhanced telephone 300 may utilize any number of distinct processor and memory elements.

As illustrated in FIG. 3, enhanced telephone 300 includes a signaling element 308, which is configured to process and communicate signaling data to and from a voice/data server 234 (see FIG. 2). Such signaling data may be associated with the operating status of enhanced telephone 300, the status of the system, or the like. Voice/data server 234, signaling element 308, and exemplary signaling techniques will be described in more detail below.

Enhanced telephone 300 may also include a switching component 310 (or an alternate call selection element) for selecting one of a plurality of lines over which to conduct a call. Switching component 310 may react in response to an instruction or control signal generated by signaling element 308. Switching component 310 may be configured in accordance with any number of conventional microprocessor-based or hardware-based techniques. As described above, enhanced telephone 300 is capable of receiving and transmitting signals over any number of twisted pairs (or other suitable conductors). In the exemplary embodiment shown in FIG. 3, a first line 312 and a second line 314 are respectively associated with twisted pair 206 and twisted pair 208 (see FIG. 2). Enhanced telephone 300 may include a socket, a plug, or other suitable connector configured to establish electrical contact with a plurality of twisted pairs, e.g., twisted pair 206 and twisted pair 208. Switching element 310 selects first line 312 or second line 314 in response to certain operating conditions of enhanced telephone 300. For example, switching element 310 may be configured to automatically select any available line (or a default line) in response to a user placing enhanced telephone 300 in an off-hook state. In addition, switching element 310 may be controlled by the user, via user interface 302, such that the user can join a call in progress on an active line (conference calling). Once a particular line is selected by switching component 310, the appropriate speaker and microphone signals 316 are routed in a conventional manner to the handset.

Notably. the amount of processing associated with enhanced telephone 300, including conventional processing, the signaling carried out by signaling element 308, and the switching performed by switching component 310, is low enough to enable enhanced telephone 300 to be line powered in a conventional manner. Accordingly, enhanced telephone 300 does not require an external power source such as a battery or household AC power.

Figure 4:
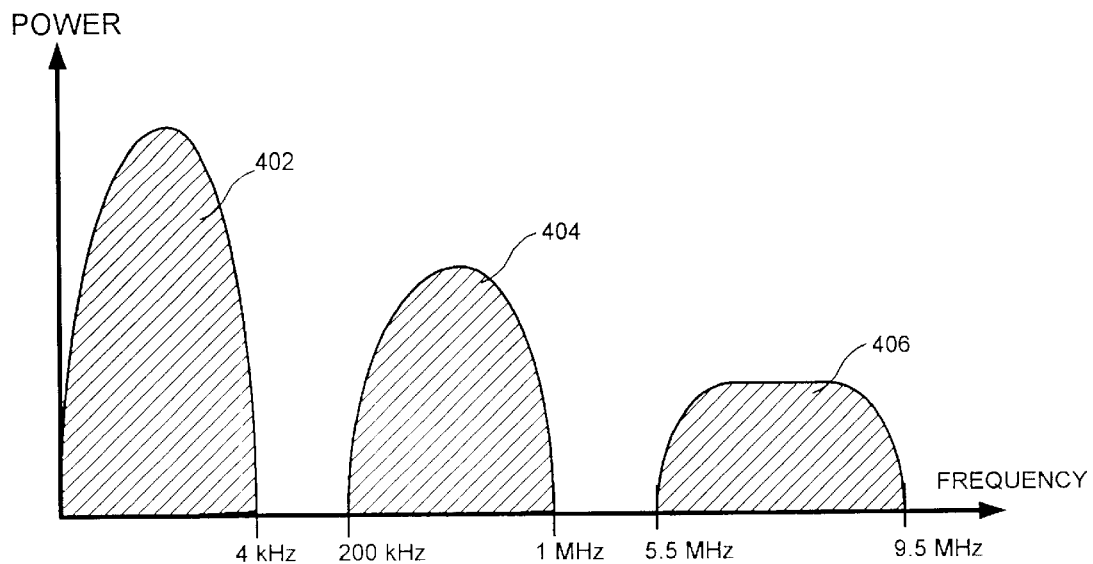
FIG. 4 is a graph showing exemplary operating frequency bands associated with various telecommunication schemes.

Enhanced telephone 300, like conventional telephone 226 (see FIG. 2), operates within the conventional POTS spectrum, i.e., below 4 kHz. FIG. 4 is a graph depicting the operating frequency band associated wvith enhanced telephone 300 and conventional telephone 226 (this operating spectrum is identified by reference number 402). Operation in the conventional 4 kHz band is desirable to enable system 200 to be fully compliant with traditional POTS telephones.

Referring again to FIG. 2, system 200 may include a NID 230, which serves as a termination point between the telephone network and the house 202. NID 230 may be configured in accordance with conventional principles (see the above description of NID 120) to convey traditional POTS telephony signals to house 202. In addition, NID 230 is capable of conveying the enhanced telephony signals described herein. In a practical implementation, a conventional and unmodified NID may be utilized to support the enhanced techniques of the present invention.

Voice/Data Server

As mentioned briefly above, system 200 includes voice/data server 234, which is configured to receive, transmit, and process digital data 236 to and from house 202. In the context of one illustrative embodiment, digital data 236 conveys telephony data, e.g., data related to voice transmissions, facsimile transmissions, or the like. Generally, voice/data server 234 is configured to process calls associated with a plurality of different telephone numbers corresponding to a number of telephony devices operatively connected to a single twisted pair (although more than one twisted pair may be included in system 200). In a practical embodiment, voice/data server 234 may employ a high speed digital data transmission scheme such as a version of DSL, ISDN, fiber optic communication, packetized IP, wireless digital communication, or the like. Generally, voice/data server 234 functions as a digital to analog (and vice versa) interface to house 202. In other words, voice/data server 234 can transform a received digital signal into an appropriate analog signal for use with enhanced telephones 220, 222, 224 (and for use with conventional telephone 226); voice/data sever 234 can also transform analog data received from house 202 into digital data for transmission via the high speed digital transmission scheme.

Voice/data server 234 may be physically placed at any convenient location. For example, in the embodiment depicted in FIG. 2, voice/data server 234 is located proximate house 202. In a practical installation, voice/data server 234 can be located within house 202 as long as it establishes connectivity with twisted pairs 206, 208. In this context, voice/data server 234 may be physically configured like a modem or a cable television reception box that plugs into one of jacks 210, 212, 214. Alternatively, voice/data server 234 may be an externally located component that provides analog signals to NID 230 or it may be integrally formed within NID 230.

Voice/data server 234 may also be placed at a remote location relative to house 202. In an alternate operating environment, voice/data server 234 is associated with a digital loop carrier (not shown) that services a plurality of customer sites. Digital loop carriers and their operation are known to those skilled in the art and, therefore, will not be described in detail herein. The digital loop carrier receives digital telephony signals and distributes the telephony services to a number of sites within a relatively limited area, e.g., an area that services up to 1000 houses (the actual support capacity of a given digital loop carrier may vary according to the specific application). In a typical architecture, the digital loop carrier may be up to several thousand feet away from house 202. However, the 4 kHz embodiment of the present invention is, for practical purposes, insensitive to the distance between house 202 and voice/data server 234. For this reason, voice/data server 234 may also be incorporated in the local central office associated with house 202 (central offices can be located up to 18,000 feet away from the customer site).

Figure 5:
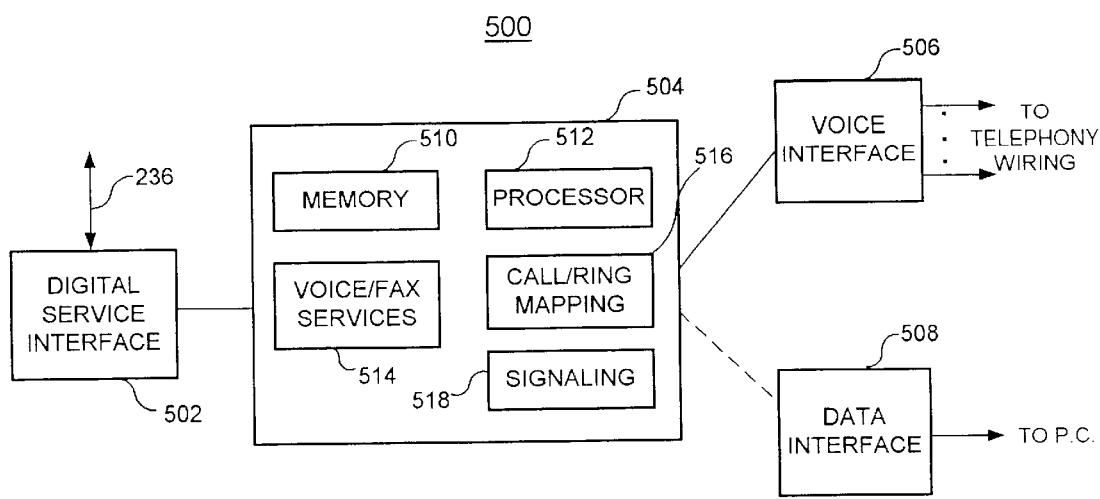
FIG. 5 is a block diagram representation of an exemplary voice/data server according to the present invention.

FIG. 5 is a block diagram representation of an exemplary voice/data server 500 that may be utilized by system 200. Voice/data server 500 is configured to generate analog telephony signals in accordance with conventional 4 kHz bandwidth telephony protocols. Voice/data server 500 generally includes a digital service interface 502, a general processing element 504, a voice interface 506, and a data interface 508. In a practical application, portions of processing element 504 may be alternately implemented in voice interface 506 or data interface 508. Digital service interface 502 includes components, features, and elements associated with a suitable high speed digital data transmission scheme. As described above, digital service interface 502 may be configured in accordance with conventional DSL, ISDN, fiber optic, wireless, or other technologies that may be currently known or developed in the future. Digital service interface 502 receives and transmits digital data 236 that conveys information utilized by system 200.

Digital service interface 502 may be operatively coupled to processing element 504. Processing element 504, possibly in conjunction with voice interface 506 or data interface 508, may be configured to provide the functions associated with conventional telephony line cards. For example, voice/data server 500 may be suitably configured to perform at least the following functions: provide operating power to the telephone devices located in house 200; detect off-hook and on-hook conditions of the telephone devices; detect and process DTMF signals; generate ringing signals; provide over-voltage protection; perform supervisory processes; coding; hybriding; and testing. To this end, processing element 504 may include any number of memory elements 510 and any number of microprocessor elements 512 suitably configured to carry out the procedures described herein.

Processing element 504 may also include or be functionally associated with the provision, distribution, and/or operation of any number of voice, fax, or other telephony services 514 (the specific telephony service parameters may be stored in a suitable database maintained by voice/data server 500. In the context of this description, voice/fax services 514 may be actually provided by voice/data server 500, processing element 504, one or more remote components associated with system 200, and/or one or more components associated with the telecommunication system within which system 200 operates. Voice/fax services 514 may be associated with enhanced features not normally available in a conventional POTS environment. For example, voice/fax services 514 may function in cooperation with a call/ring mapping element 516 such that calls to different telephone numbers are rung in a distinctive manner or such that the user can regulate the incoming and outgoing call traffic for each of the telephone numbers associated with house 202. With this type of enhanced telephony service, system 200 can restrict calls placed to a specific telephone number to any time period, e.g., only during daytime hours. In this manner, system 200 can also be configured to block a specific telephone number from dialing long distance calls or from receiving calls originating from certain telephone numbers. In addition, voice/fax services 514 may be associated with caller identification, call blocking, voice mail, and other services that may be presently known or developed in the future.

As described briefly above, call/ring mapping element 516 may be utilized to provide the user with more control over the flow of call traffic to and from house 202. In a practical embodiment, call/ring mapping element 516 may be associated with a look-up table that includes entries for each telephone number (including voice and fax numbers) supported by system 200. Each telephone number entry may identify call restrictions related to the times during which the telephone number can place or receive calls, the telephone devices designated to ring in response to a call placed to the telephone number, the format of the ring tone or ring pattern associated with the telephone number, whether the telephone number is associated with a fax machine or a voice telephone, or the like. Thus, call/ring mapping element 516 is associated with the regulation of call traffic and associated with ringing characteristics for a plurality of different telephone numbers.

Processing element 504 may also include a suitable signaling element 518, which is compatible with signaling element 308 employed by enhanced telephone 300 (see FIG. 3). Signaling element 518 cooperates with signaling element 308 such that signaling data is processed and transmitted (bidirectionally) between voice/data server 234 and enhanced telephone 300. The signaling feature is described in detail below.

Voice/data server 500 may include data interface 508 for providing digital data to a data processing device such as a personal computer (not shown). Data interface 508 may contain suitable processing and/or logic for compatibility with ethernet, universal serial bus, or other technologies for communicating with the personal computer. Data interface 508 may be desirable to enable voice/data server 500 to provide house 202 with high resolution video signals, high quality audio signals, and high speed internet access. It should be appreciated that in a practical implementation that utilizes copper transmission wires between voice/data server 500 and house 202, the transmission quality of the digital data may be affected by the distance between voice/data server 500 and house 202 (due to attenuation losses at high frequencies).

Voice interface 506 is configured to perform any number of functions associated with the processing of voice and fax signals; such voice and fax signals are eventually transmitted over the telephony wiring (e.g., twisted pairs) located at house 202. It should be noted that conventional voice and fax calls are substantially identical from the perspective of the telephone system. Processing element 504 may be suitably configured to analyze incoming data and to route the incoming data to either voice interface 506, data interface 508, or any appropriate voice, fax, or data service.

Figure 6:
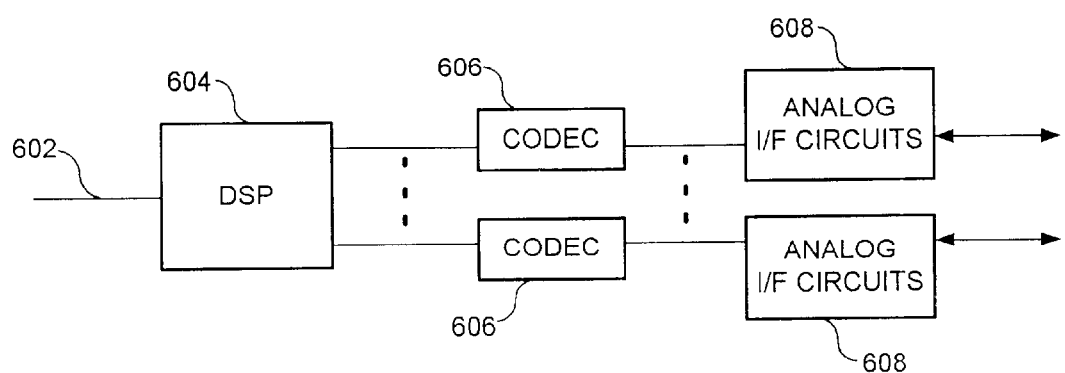
FIG. 6 is a block diagram representation of an exemplary voice interface that may be utilized by the voice/data server shown in FIG. 5.

FIG. 6 is a block diagram representation of a typical voice interface 600 that may be employed in the context of a preferred 4 kHz embodiment of the present invention. The input 602 to voice interface 600 is connected (directly or indirectly) to processing element 504 (see FIG. 5). Voice interface 600 may include a multiprocessing digital signal processor ("DSP") 604 that is configured to implement speech coding and fax/data modem modulation. DSP 604 may also be capable of carrying out any number of functions normally associated with 4 kHz telephony signal processing.

DSP 604 generates a number of output signals associated with a number of CODECs 606. CODECs 606 are configured to perform data coding and decoding in accordance with conventional telephone systems. The respective outputs of CODECs 606 are preferably routed to analog interface ("I/F") circuits 608. I/F circuits 608 provide over voltage protection, provide line voltage/current, generate ringing signals, and detect on-hook and off-hook conditions associated with the telephone and fax devices. The output signals generated by voice interface 600 are eventually routed to house 202 via suitable conductors (e.g., twisted pairs). Voice interface 600 is also configured to receive and process upstream signals that originate from the telephony devices.

Voice/data server 500, in conjunction with other operational protocols of system 200, allows the telephony distribution intelligence to be "located" at the edge of the network. In other words, the telephony data is suitably delivered to voice/data server 500, which processes, distributes, monitors, and regulates call traffic associated with system 200.

Signaling

As described above, voice/data server 500 and enhanced telephone 300 are capable of performing a signaling procedure. In the context of system 200, one exemplary signaling procedure operates within the conventional 4 kHz spectrum normally associated with POTS telephone systems. Any suitable signaling protocol may be utilized by voice/data server 500 and enhanced telephone 300 to communicate control, supervisory, status, and other information therebetween. For example, system 200 may employ a simple modem protocol, such as V.21, Bell-202, Bell-103, or the like, to convey signaling data between voice/data server 500 and any number of enhanced telephones 300 that may be located within house 202. The signaling technique utilized by system 200 is selected such that it has little or no effect on the operation of conventional POTS telephones. Indeed, V.21 modulated signals will be interpreted as noise and ignored by a conventional POTS telephone instrument.

One suitable embodiment utilizes V.21 modem techniques for signaling. Accordingly, signaling element 308 (associated with enhanced telephone 300) and signaling element 518 (associated with voice/data server 500) are both compatible with the V.21 protocol. V.21 modems and the V.21 protocol are well known to those skilled in the art and, therefore, will not be described in detail herein. V.21 modems are desirable because they have a relatively simple design, they can be implemented in a semiconductor chip having a very small footprint, and they can be operated with a small amount of power (an exemplary V.21 modem can be easily powered with the 48 volt line voltage associated with conventional POTS telephone lines). Furthermore, V.21 modems are robust in nature and they can train on data (no initial training procedure need be performed). In addition, due to the simple modulation techniques used by V.21 modems, line impairments have little effect oil the transmitted data.

The specific format of the signaling data, and the manner in which the signaling data is generated, received, and processed, may vary from application to application. Indeed any number of prior art framing, flagging, error coding, and other data communication techniques may be used in this context.

Incoming Call Processing

Referring to FIG. 2 and FIG. 5, the signaling procedure may be employed to enable system 200 to provide and distribute the enhanced telephony services described above. For example, the signaling procedure can enable system 200 to support a plurality of telephone and/or fax numbers with a single twisted pair within house 202. For illustrative purposes, assume that system 200 supports four telephone numbers (111-1111, 222-2222, 333-3333, and 444-4444) on a single twisted pair, e.g., twisted pair 206. Any given telephone number may be related to one or more different telephone or fax devices. The embodiment illustrated in FIG. 2 includes four telephone devices; one of the four is a conventional telephone 226. If voice/data server 234 receives a call directed to number 222-2222, then signaling element 518 will generate a suitable V.21 signal for transmission on twisted pair 206 (this example assumes that twisted pair 208 is not present). The V.21 signal is transmitted prior to the generation of a ring signal by voice interface 506. The V.21 signal conveys modulated data that identifies which of the three enhanced telephone devices should ring in response to the incoming call. As described above in connection with call/ring mapping element 516, voice/data server 500 may be programmed with the intelligence to determine which phone and fax devices are associated with each telephone number, whether there are any incoming call restrictions associated with the telephone numbers, whether there are any outgoing call restrictions associated with the telephone/fax devices, or the like.

Each of the enhanced telephones 220, 222, 224 is configured such that it can monitor twisted pair 206 and "listen" for signaling data. In this respect, each of the enhanced telephones 220, 222, 224 may have an "address" or a suitable identifier to enable it to determine whether a signaling command is directed to it. Each enhanced phone 220, 222, 224 may have a unique address or a number of enhanced phones 220, 222, 224 may share the same address. Accordingly, each of the enhanced telephones 220, 222, 224 receive the V.21 signal and process the signaling data in a suitable manner (see FIG. 3 and associated description). Each of the enhanced telephones 220, 222, 224 includes the processing power and intelligence to analyze the received signaling data and to determine whether the signaling data contains a ring instruction. If an enhanced telephone 220, 222, 224 detects such a ring instruction, then it will ring in response to the immediately following ring signal (which is generated by voice/data server 234). If an enhanced telephone 220, 222, 224 does not detect such a ring instruction (or, equivalently, if a no-ring instruction is detected), then it will remain silent in response to the immediately following ring signal. In contrast, conventional telephone 226, which does not include the V.21 capability, will ignore the signaling data and will ring in response to any ring signal present on twisted pair 206.

Outgoing Call Processing

In the 4 kHz embodiment, each of the enhanced telephones 220, 222, 224 is also configured with additional functionality associated with outgoing calls. For example, in response to an off-hook condition at enhanced telephone 222, signaling element 308 may transmit signaling data that identifies enhanced telephone 222 to voice/data server 234. Alternatively, the signaling data may identify the telephone number associated with enhanced telephone 222. In a general sense, the signaling data transmitted by enhanced telephone 222 somehow identifies the calling party to voice/data server 234. In a practical embodiment, each enhanced telephone 220, 222, 224 may be associated with a uniquely distinguishable device identifier. Voice/data server 234 obtains the device identifier information and may consult call/ring mapping element 516 and/or some other functional component associated with the regulation and monitoring of call traffic. In this manner, voice/data server 234 can determine whether enhanced telephone 222 is allowed to place calls at that particular time, whether enhanced telephone 222 is allowed to place calls to the subsequently dialed telephone number, or the like.

If twisted pair 206 is not currently in use, then enhanced telephone 222 may automatically generate and transmit the calling party identifier immediately in response to the off-hook status. On the other hand, if a call is already in progress on the selected twisted pair, then it may be distracting to the current users if the signaling data is transmitted (a V.21 signal may be audible). Accordingly, enhanced telephone 222 contains the intelligence necessary to determine whether or not the line is currently in use. If so, then the device identification data is not transmitted. Enhanced telephone 222 may utilize any number of conventional techniques, such as line current monitoring and detection, to determine whether or not the current line is active. In response to the processing of the telephony services, e.g., after consulting the call/ring mapping element, voice/data server 234 may provide an outgoing call authorization such that a digital call transmission may be established by voice/data server 234.

It should be appreciated that system 200 may be operated such that the telecommunication devices in house 202 are divorced from the physical conductors (e.g., twisted pairs) connected thereto. In other words, system 200 can support any number of different telephone numbers, and distribute calls placed to those telephone numbers, on a single twisted pair conductor. Accordingly, system 200 is in stark contrast to the conventional POTS paradigm in the house, wherein each telephone device is connected to only one twisted pair and wherein each twisted pair is only associated with one telephone/fax number. Unfortunately, having a plurality of users supported by a single twisted pair may be inconvenient because, if the twisted pair is in use, then no other incoming or outgoing calls can be placed.

Multiple-Line Call Processing

The foregoing inconvenience associated with single-line wiring may be addressed in most practical applications (particularly in newer homes that are wired with more than one twisted pair). As described above in connection with FIG. 2 and FIG. 3, each enhanced telephone 220, 222, 224 may be connected to a plurality of different twisted pairs (FIG. 2 shows each enhanced telephone 220, 222, 224 being coupled to only two twisted pairs 206, 208). With such an arrangement, voice/server 234 can direct call traffic in an efficient manner by intelligently selecting an available twisted pair for any given call. In this respect, memory 510, processor 512, call/ring mapping element 516, and/or other functional components associated with voice/server 500 (see FIG. 5) cooperate to provide call scheduling, resource monitoring, and traffic regulation for system 200. These elements of voice/data server 500 may react to the signaling information received by voice/data server 500.

In a multiple-line embodiment, an incoming call is processed in substantially the same manner described above. However, in response to an incoming call, voice/data server 234 may initially confirm whether a twisted pair is available and, if so, select or identify the twisted pair for the current call. The signaling data transmitted by voice/data server 234 may suitably convey a line identifier so that enhanced telephones 220, 222, 224 can determine the active line. As shown in FIG. 2, enhanced telephones may include buttons, lights, a display, or any suitable device 240 for indicating and/or selecting the active line. For example, if the signaling data from voice/data server 234 indicates that only enhanced telephone 222 is to ring on twisted pair 208, then enhanced telephones 220, 224 will remain silent without any indication of an incoming call. However, enhanced telephone 222 will ring (or otherwise alert the user) and identify to the user that twisted pair 208 should be selected to complete the call. In practice, enhanced telephone 222 may display a flashing light for "LINE TWO" such that the user is prompted to engage an appropriate button or switch on the user interface.

The ringing of conventional telephones, such as telephone 226, may follow any number of protocols. For example, if conventional telephone 226 is only connected to a single twisted pair (as shown), then voice/data server 234 may be programmed to select that twisted pair as the default line, thus increasing the likelihood that telephone 226 will ring. Alternatively, house 202 may be wired (and voice/data server 234 may be suitably programmed) such that the twisted pair coupled to conventional telephone 226 is not shared by any enhanced telephones. The particular wiring and ringing options may vary according to the specific user preferences and/or according to the physical layout of house 202.

In the multiple-line embodiment, outgoing calls are placed in substantially the same manner described above. However, a user may have the option of selecting one of a plurality of inactive lines over which the outgoing call will be placed. In addition, the user may also have the ability to select an active line for participation in a conference call. Assuming the user selects an available twisted pair, then the V.21 signaling data may identify the selected twisted pair to voice/data server 234 (along with the calling device identifier) such that voice/data server 234 can process the call in an appropriate manner, update its call/ring mapping element, and/or update its call traffic monitor. It should be appreciated that enhanced telephones 220, 222, 224 may be further configured to automatically select an available twisted pair in response to an off-hook condition (rather than stay dominant pending a line selection by the user). As described above, a particular twisted pair may be designated as the default line.

Operation of conventional telephone 226 in a multiple-line environment may not differ from the current POTS protocol. In other words, conventional telephone 226 is not affected by the wiring of enhanced telephones 220, 222, 224 because conventional telephone 226 is coupled to a single twisted pair. Conventional telephone 226 may use conventional line current detection schemes to determine whether its line is currently in use by another conventional or enhanced telephone. Voice/data server 234 is suitably configured to detect (using, e.g., any number of conventional line-in-use detection techniques) whether conventional telephone 226 initiates an outgoing call. As described above, in response to an off-hook condition at conventional telephone 226, voice/data server 234 may update its call/ring mapping element such that it maintains a current status of all of the lines servicing house 202.

Exemplary Wiring Scheme

As described above in connection with the multiple-line embodiment, each enhanced telephone 220, 222, 224 is wired such that it may receive and place calls on any number of different twisted pairs, e.g., twisted pairs 206, 208. Such an embodiment may require a slight modification to the wiring convention currently associated with homes compatible with POTS telephony services.

Figure 7A:
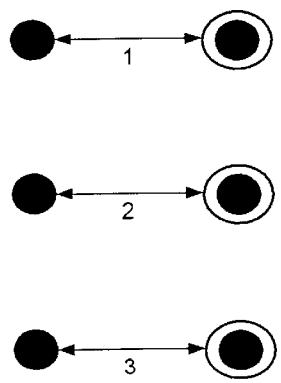
FIG. 7 is a schematic diagram of twisted pair wiring schemes.
Figure 7B:
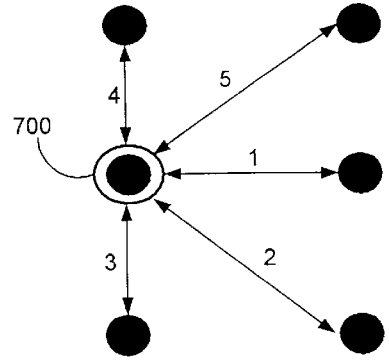
Figure 7C:
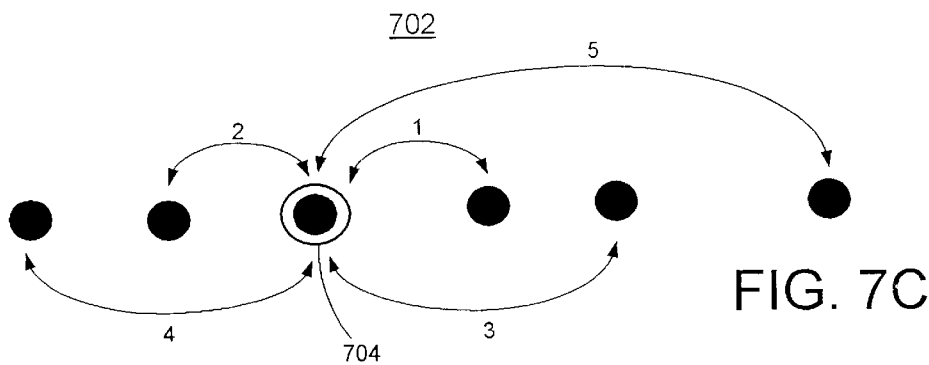

With reference to FIG. 7, conventional RJ-11 jacks are capable of receiving up to six individual wires (i.e., three twisted pairs). One commonly proposed wiring scheme is depicted in FIG. 7A. Each twisted pair represents a common wire (shown as a circled point) and a signal wire. In contrast, the present invention may employ an alternate wiring scheme such that N individual wires can support N-1 distinct telephone lines. To accomplish this, a single wire is designated as the common wire for the N-1 lines. FIG. 7B depicts such an arrangement with a common wire 700 associated with each of the remaining five wires. FIG. 7C depicts a conventional RJ-11 jack 702 that is configured in accordance with the present invention to provide connectivity for five telephone lines. The third pin 704 is associated with the common wire, and the remaining pins are respectively associated with one of the five lines.

DC line power is supplied to enhanced telephones and conventional telephone devices via the twisted pairs. Techniques associated with the generation, regulation, and provision of DC line power, which are well known to those skilled in the art, will not be described in detail herein. To reduce the likelihood of overloading associated with the common wire, the polarities of the "tip and ring" voltages for the multiple lines are appropriately assigned. For example, because telephone devices are configured to operate with a ±48 VDC tip and ring voltage (referenced to a common wire), the polarity of each individual signal wire is irrelevant. Accordingly, the amount of current flowing through the common wire can be managed by reversing the polarity of an appropriate number of the signal wires. Thus, in an exemplary configuration (as shown in FIG. 7C), lines one, three, and five utilize a positive tip and ring voltage while lines two and four utilize a negative tip and ring voltage.

Fax Machine Applications

As described briefly above, system 200 may be suitably configured to support any number of conventional fax machines having different telephone numbers associated therewith. Due to the flexible use of wiring resources, system 200 can efficiently support relatively low-duty fax machines in a manner that does not rely on a devoted fax line. System 200 may also be capable of receiving fax calls placed to different telephone numbers and routing the fax calls to a single fax machine device. It should be appreciated that an enhanced fax machine may include the features and functionality described above in connection with the enhanced telephones.

Figure 8:
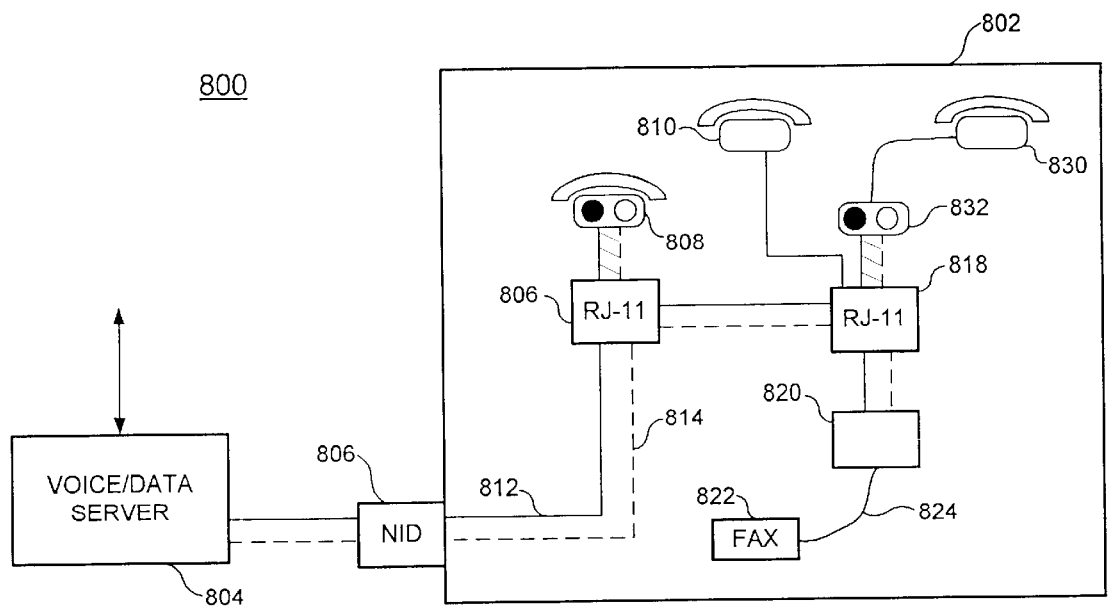
FIG. 8 is a schematic representation of a customer site configured to support fax machine transmissions.

Referring to FIG. 8, a telephony services distribution system 800 may be employed to manage voice and fax calls associated with a customer site, e.g., a house 802. Unless otherwise described herein, system 800 is configured in a similar manner as system 200. For example, system 800 may include a voice/data server 804, an enhanced telephone 808, a conventional telephone 810, a number of electrical conductors (e.g., twisted pairs) 812, 814, and a number of electrical connectors (e.g., RJ-11 jacks 816, 818) associated with twisted pairs 812, 814. The configuration, operation, and functionality of these elements and components are described above in connection with system 200. It should be appreciated that the following description of system 800 applies to either a single-line system or a multiple-line system (as shown in FIG. 8).

System 800 preferably includes a fax interface device 820, which is operationally associated with at least one conventional fax machine 822 (the concepts described herein may be equivalently applied in the context of an environment where fax interface device 820 supports more than one fax machine). Fax interface device 820 is coupled between jack 818 and fax machine 822. As described in more detail below, fax interface device 820 may be connected to each of the twisted pairs 812, 814 in the upstream direction to facilitate the efficient use of wiring resources by system 800. In the downstream direction, fax interface device 820 may utilize a devoted line 824 for fax machine 822.

Fax interface device 820 is capable of performing the signaling procedures described above. In this respect, fax interface device 820 may include any number of the functional elements described above in connection with enhanced telephone 300 (see FIG. 3). For example, fax interface device 820 may include a suitable amount of processing and memory power, a user interface, and a switching element for selecting a twisted pair 812, 814 for transmission. Furthermore, fax interface device 820 preferably includes a signaling element (e.g., a V.21 modem) configured to communicate with voice/data server 804 in the manner described above in connection with system 200.

For an incoming fax call, voice/data server 804 processes the digital signal in the manner described above. Notably, voice/data server 804 has the intelligence and processing power necessary to determine that the incoming call is associated with a fax number rather than a voice number. In this respect, the call/ring mapping element associated with voice/data server 804 may contain a look-up table that identifies the called number as a fax number. As with conventional fax systems, system 800 will assume that any calls placed to a fax number have originated from another fax machine. Once identified as a fax number, voice/data server 804 can perform the appropriate signaling routine and suitably route the call to fax interface device 820.

The V.21 signaling data may inform fax interface device 820 that the incoming call is a fax call directed to fax machine 822. Thus, enhanced telephone 808 will ignore the incoming call (conventional telephone 810 will interpret the V.21 signal as noise). In an exemplary practical embodiment, fax calls are directed to fax machine 822 in a silent manner, i.e., enhanced telephone 808 and conventional telephone 810 will not ring. Such silent ringing is performed by fax interface device 820, which suitably generates a one-way ring signal (voltage or current) associated with fax machine 822. In other words, fax interface device 820 generates a ring signal devoted to fax machine 822 on line 824, while twisted pairs 812, 814 remain unaffected. Thus, any conventional telephones connected to twisted pairs 812, 814 will riot receive a ring signal. In response to the ring signal generated by fax interface device 820, fax machine 822 will go off-hook and answer with a conventional answer tone. Fax interface device 820 may then perform an appropriate switching procedure such that the end-to-end fax call is connected.

With respect to fax calls that originate from fax machine 822, fax interface device 820 may function in much the same manner described above in connection with outgoing telephone calls associated with enhanced telephones 220, 222, 224. For example, fax interface device 820 may be configured to detect which of the twisted pairs 812, 814 are currently in use, select one of the twisted pairs 812, 814 for use with the subsequent fax call, generate appropriate signaling data to provide voice/data server 804 and enhanced telephone 808 with the ongoing status of fax interface device 820, and the like. In response to a fax transmission initiation at fax machine 822, fax interface device 820 may go off-hook on an available twisted pair 812, 814. In addition, fax interface device 820 (or fax machine 822) may be configured to inform voice/data server 804 that the outgoing call is a fax call rather than a voice call.

If system 800 employs conventional pass-through fax data transmission techniques, then voice/data server 804 need not be informed of the type of outgoing call because outgoing voice and fax calls are treated in a similar manner. However, if system 800 employs a demod/remod fax transmission protocol (or other data transmission protocols), then voice/data server 804 may handle fax data differently than voice data. Consequently, system 800 is suitably configured in a flexible manner to enable voice/data server 804 to distinguish between voice and fax calls if necessary.

Fax interface device 820 and/or fax machine 822 may be configured to provide a suitable notification to voice/data server 804 to identify the outgoing call as a fax call. For example, fax interface device 820 may be configured to go off-hook in a manner that is recognizable by voice/data server 804. Any suitable off-hook/on-hook timing pattern or sequence may be employed such that voice/data server 804 can readily determine that the outgoing call is a fax call. Alternatively, fax interface device 820 or fax machine 822 may be programmed to send a specific sequence of DTMF tones (e.g., *80 or any unique prefix sequence that is not currently utilized for other purposes) prior to dialing the outgoing number. In an alternate embodiment, the DTMF sequence may be entered manually by the user. In the exemplary embodiment, the outgoing fax call identifier is conveyed via the V.21 signaling procedure. Accordingly, in response to an off-hook condition associated with fax machine 822, and assuming that a twisted pair is available, fax interface device 820 generates a V.21 signal that informs voice/data server 804 that an outgoing fax call is forthcoming on the selected twisted pair 812, 814.

If voice/data server 804 is aware that outgoing call is a fax call, then the fax call may be processed in an appropriate manner prior to digital transmission by voice/data server 804.

Conventional Telephone Interface

Consumers may be more willing to accept and utilize an enhanced telephony system according to the present invention if the conversion from legacy POTS telephones to enhanced telephones can be accomplished in a gradual manner. Accordingly, conventional telephones may also be utilized in an enhanced manner by a 4 kHz system without a costly equipment overhaul. For example, as shown in FIG. 8, a conventional telephone 830 may be may be connected to jack 818 via a telephone interface device 832. Telephone interface device 832 preferably contains the components and functionality associated with enhanced telephone 300 (described above in the context of FIG. 3). Telephone interface device 832 may be located near to conventional telephone 830 to enable the user to easily monitor the different lines throughout house 802 and to enable the user to easily select a twisted pair to use in placing an outgoing call or in joining a conference call.

Cordless Telephone Applications

Figure 9:
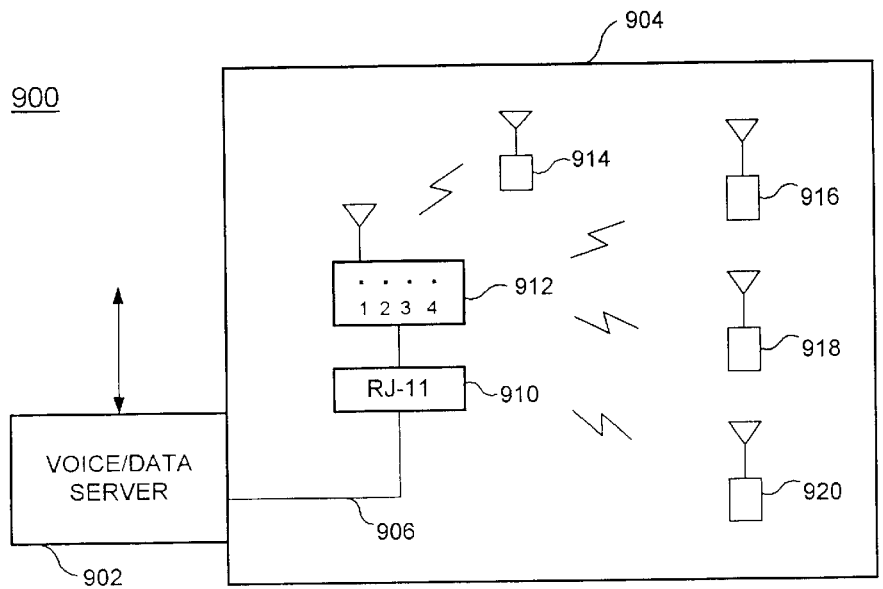
FIG. 9 is a schematic representation of a customer site configured to support cordless telephone devices.

FIG. 9 is a schematic representation of a telephony services distribution system 900 configured to support cordless telephone devices. System 900 includes a voice/data server 902 that receives and transmits digital telephony signals associated with a customer site, e.g., a house 904. For the sake of brevity and clarity, house 904 is shown with only one twisted pair 906 and only one telephone jack 910. However, system 900 may include any number of twisted pairs servicing any number of conventional telephones (wired or cordless), any number of wired enhanced telephones, and/or any number of fax machines. The simple system shown in FIG. 9 is merely intended to illustrate a cordless application of the present invention.

System 900 includes an enhanced cordless base station 912 configured to communicate with a number of cordless handsets 914, 916, 918, 920. System 900 may be desirable to enable the operation of a plurality of cordless telephones, each having its own telephone number, in conjunction with a single base station 912. In a practical system, each of the cordless handsets may have a separate recharging station (not shown) associated therewith such that a different handset can be "assigned" to a specific person and/or to a specific location within house 904. Base station 912 may be compatible with any number of conventional cordless telephone and wireless fax techniques that enable base station 912 to communicate with the cordless handsets (or wireless fax machines). Such cordless telephony techniques and operating protocols are known to those skilled in the art and will not be described in detail herein.

Base station 912 is also configured to support the enhanced features described above in connection with enhanced telephone 300. Indeed, base station 912 may include or be associated with the components and functionality described above to enable system 900 to service the different cordless handsets with only one twisted pair 906. For example, voice/data server 902 and base station 912 preferably perform V.21 signaling procedures to initiate calls, monitor the status of twisted pair 906, and regulate the call traffic associated with the cordless handsets.

An incoming call placed to the telephone number associated with cordless handset 914 may be processed in substantially the same manner described above. If twisted pair 906 is available, then voice/data server 902 will transmit signaling data indicating that the incoming call is addressed to cordless handset 914. Base station 912 may then transmit a suitable ring signal only to cordless handset 914 and thereafter handle the incoming call in a conventional manner.

An outgoing call placed by a cordless handset may involve signaling to identify the specific handset or the specific telephone number associated with the originating handset. For example, in response to an off-hook condition, cordless handset 916 may communicate its identifier to base station 912 in accordance with any number of cordless signaling protocols. A distinctive identifier may be assigned to each cordless handset during a "registration" procedure with base station 912. The registration procedure may program the cordless handsets and base station 912 such that only the registered cordless handsets can operate with base station 912. In the context of this description, "cordless signaling" is used to differentiate the signaling between the cordless handsets and cordless base station 912 from the signaling between cordless base station 912 and voice/data server 902.

In response to the cordless signaling, base station 912 may then transmit an appropriate V.21 signal to voice/data server 902 to identify the telephone number associated with the originating cordless handset 916. Voice/data server 902 may utilize this information to regulate or monitor the call traffic in the manner described above in connection with system 200.

The various features and alternate embodiments described above in connection with the enhanced 4 kHz embodiment may be combined in any desirable fashion to suit the needs of the particular application. The enhanced 4 kHz embodiment reflects a relatively low cost solution because the enhanced components and functionality may be easily implemented and because the enhanced systems do not require a substantial departure from the current POTS scheme. In addition, the enhanced 4 kHz embodiment is flexible in nature because the functionality of the voice/data server can reside proximate the customer premises, at a digital loop carrier, or further away at a central office.

Enhanced Wideband Embodiment

Although the enhanced 4 KHz embodiment is a useful and practical solution, it may be inconvenient and costly to implement from the perspective of the service providers. As described above, the preferred multiple-line embodiments may require the rewiring of the conventional RJ-11 jacks such that a single enhanced telephone is connected to a plurality of twisted pair lines. In the vast majority of customer sites, the rewiring of jacks and/or the routing of new telephone wiring may be cost prohibitive. An alternate embodiment of the present invention, which may be fully implemented with only one twisted pair, avoids such rewiring problems.

Figure 10:
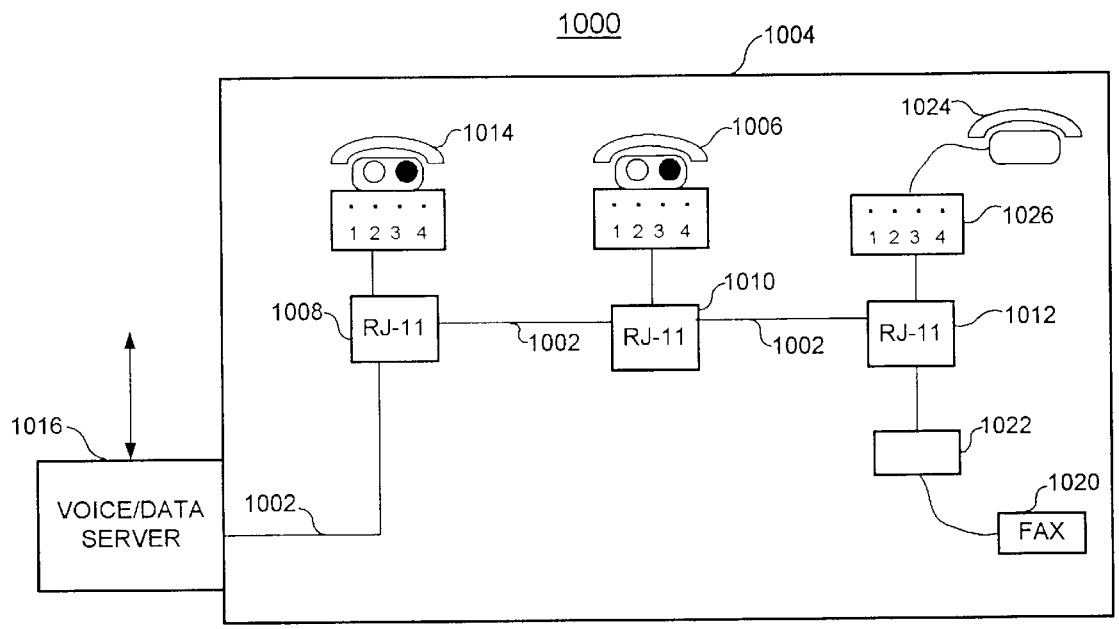
FIG. 10 is a a schematic representation of a customer site in accordance with an alternate embodiment of the present invention.

FIG. 10 is a schematic representation of a telephony services distribution system 1000 configured in accordance with an alternate embodiment of the present invention. In contrast to the enhanced 4 kHz embodiment, which operates in the conventional POTS spectrum below 4 kHz, system 1000 is configured to operate in a much wider frequency band. In a practical embodiment, system 1000 utilizes frequencies that are not currently used by conventional POTS devices and those that are not currently being considered for use with future systems (e.g., the home network band between 5.5. MHZ and 9.5 MHZ). Referring again to FIG. 4, system 1000 may be configured to operate in the band between approximately 200 kHz and 1 MHZ (identified by the reference number 404). In contrast, the POTS band 402 and the home network band 406 do not overlap with frequency band 404. For example, the Home PNA group may define isochronous channels within the Home PNA band from approximately 5.5 MHZ to 9.5 MHZ. These channels and this frequency band may be used without change to the present invention. The specific operating frequencies associated with system 1000 may vary depending upon the particular application and the present invention is not limited to the exemplary bands and channels described herein.

To emphasize the advantages of the wideband embodiment of the present invention, FIG. 10 depicts system 1000 having only one telephone line (e.g., a twisted pair 1002) supporting a house 1004. Furthermore, because the wideband features of system 1000 operate in frequency band 404, any number of conventional POTS telephones and enhanced 4 kHz telephones (described above) may also be supported by twisted pair 1002. For the sake of clarity, conventional telephones and enhanced 4 kHz telephones are not shown in FIG. 10. Although not shown, system 1000 may also be compatible with an NID, as described above in the context of FIG. 2.

As described above in connection with system 200, twisted pair 1002 and RJ-11 jacks 1008, 1010, 1012 may be arranged and configured substantially in accordance with the existing POTS twisted pair wiring scheme. In the exemplary environment depicted in FIG. 10, each of the RJ-11 jacks are electrically coupled together with twisted pair 1002. A first enhanced wideband telephone 1014 is shown coupled to jack 1008 and a second enhanced wideband telephone 1006 is shown coupled to jack 1010. Although only two enhanced wideband telephones 1014, 1006 are shown, any practical number may be utilized by system 1000. Enhanced telephones 1014, 1006 are configured to communicate with a voice/data server 1016 (described in more detail below).

Figure 11:
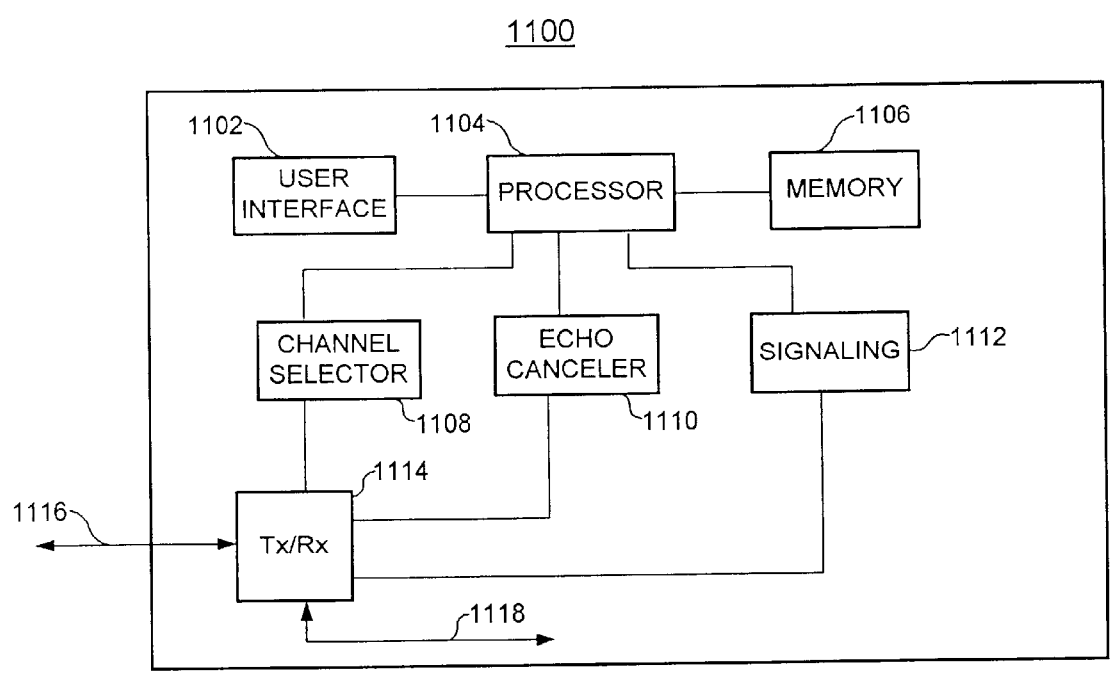
FIG. 11 is a block diagram representation of an exemplary enhanced telephone device configured in accordance with the wideband embodiment of the present invention.

FIG. 11 is a block diagram representation of an exemplary enhanced wideband telephone 1100. Each of the enhanced wideband telephones 1014, 1006 may be suitably configured in a similar manner. Enhanced telephone 1100 includes a suitably configured user interface 1102, a processor 1104 having an appropriate amount of processing power, and a memory element 1106 having an appropriate amount of storage capacity. Unless otherwise described herein, user interface 1102, processor 1104, and memory element 1106 are similar in form and function to the equivalent components described above in connection with FIG. 3. Enhanced wideband telephone 1100 may be powered by a battery, by an external source such as the standard household alternating current source, by the conventional line voltage, or by any suitable power supply.

Briefly, enhanced telephone 1100 communicates with voice/data server 1016 within band 404 (see FIG. 4), which is divided into a plurality of distinct communication channels (i.e., relatively narrow and non-overlapping frequency bands). The different channels are utilized to enable system 1000 to distribute telephony services to a plurality of telephone and/or fax devices over the single twisted pair 1002. Although not depicted in FIG. 11, enhanced telephone 1100 may include a socket, a jack, a plug, or any suitable connector configured to establish electrical contact with twisted pair 1002. In accordance with one exemplary embodiment, operating band 404 is divided into 100 channels; each of the channels has a bandwidth of 8 kHz. For the sake of simplicity, these exemplary channels do not utilize a guard band. Accordingly, 50 of the 100 distinct channels may be allocated for upstream transmissions (from enhanced telephone 1100 to voice/data server 1016) and 50 channels may be allocated to downstream transmissions from voice/data server 1016 to enhanced telephone 1100). For example, the lower frequency channels may be used for downstream transmissions and the higher frequency channels may be used for upstream transmissions. The specific allocation of upstream and downstream channels may vary depending upon the particular system or to optimize one or more operating parameters of the system. In an alternate embodiment that employs echo cancellation, 100 full-duplex channels may be supported. In another alternate embodiment, conventional 4 kHz discrete multi-tone channels may be digitally "combined" or "bonded" in an appropriate manner to facilitate communication in accordance with the wideband embodiment of the present invention.

Enhanced wideband telephone 1100 may also include an echo canceler 1110, which may be utilized in applications where system 1000 transmits and receives signals in the same channel. In addition, echo canceler 1110 may serve to cancel echo signals created in the analog portion of the telephone before the signal is transmitted. This may be desirable where the digital network introduces delays that allow such analog echo signals to be heard at the receiving end. The prior art is replete with echo cancellation techniques and any suitable conventional (or proprietary) echo cancellation technique may be employed in the context of enhanced wideband telephone 1100. System 1000 will be described in the context of distinct upstream and downstream channels; the operation of system 1000 and the concepts described herein may be applied in an equivalent manner to an embodiment that employs echo cancellation.

Enhanced telephone 1100 includes a channel selector (call selector) element 1108, which suitably selects a number of available communication channels associated with a current call. Channel selector element 1108, which is described in more detail below, is configured to select, in response to an instruction generated by signaling element 1112, at least one of a plurality of distinct communication channels supported by enhanced telephone 1100. It should be appreciated that, unlike the conventional POTS scheme, a "twisted pair" in the context of the wideband embodiment may not be equivalent to a telephone "line". Accordingly, for purposes of the wideband embodiment, a "line" is equivalent to one or more "channels" associated with a given telephone or fax call. If a full-duplex channel is employed, then a "line" may be equivalent to a single wideband "channel".

Enhanced wideband telephone 1100 also includes a signaling element 1112, which is configured to communicate signaling data to and from voice/data server 1016 (see FIG. 10). Voice/data server 1016, signaling element 1112, and exemplary signaling techniques will be described in more detail below.

A transmitter/receiver 1114 is configured to receive signaling, voice, and possibly other data from voice/data server 1016 and to transmit such data to voice/data server 1016. A cable or twisted pair 1116 conveys signals between enhanced wideband telephone 1100 and the associated RJ-11 jack. Once the appropriate channels are selected by channel selector 1108, the appropriate speaker and microphone signals 1118 are routed in a conventional manner to the handset associated with enhanced wideband telephone 1100.

As described above, enhanced wideband telephone 1100 may include a channel selector 1108 for selecting the upstream and downstream channels over which to conduct a call. In an exemplary embodiment, system 1000 employs discrete multi-tone ("DMT") techniques that enable the use of frequency division multiplexing ("FDM") in the digital domain. A suitable modulation scheme, such as quadrature amplitude modulation ("QAM") may be utilized to transmit data for each channel. For example, a 256 point QAM scheme may be suitable to obtain a theoretical data rate of 64 kbps. In the preferred embodiment, the number of QAM signal points may exceed 256 to enable system 1000 to transmit signaling data embedded in the voice/fax data. Although DMT and QAM schemes are described herein, any number of conventional digital data communication techniques may be utilized by system 1000 to facilitate the transmission of data between voice/data server 1016 and enhanced wideband telephone 1100. For example, isochronous or near isochronous techniques developed for Home PNA LAN communications may be used.

Channel selector 1108 may be configured in accordance with any number of conventional microprocessor-based or hardware-based techniques. As described above, enhanced telephone 1100 is capable of receiving and transmitting signals over any number of discrete frequency channels. For example, in accordance with DMT techniques, the analog operating frequency band (e.g., between 200 kHz and 1 MHZ) is digitized such that the discrete digital channels are obtained. Channel selector 1108 selects (in the digital domain) from among the available channels in response to certain operating conditions of system 1000. For example, channel selector 1108 may be configured to automatically select any available upstream channel (or a default channel) in response to a user placing enhanced wideband telephone 1100 in an off-hook state. In addition, channel selector 1108 may be controlled by the user, via user interface 1102, such that the user can join a call in progress associated with an active channel (conference calling). In addition, channel selector 1108 may suitably respond to a downstream channel assignment transmitted from voice/data server 1016 via the signaling procedure. Once the particular channels are selected, channel selector 1108 may dynamically control the operation of transmitter/receiver 1114 such that transmitter/receiver 1114 is "tuned" to the appropriate transmit and receive channels. In this context, channel selector 1108 and/or transmitter/receiver 1114 may utilize any number of conventional equalization, signal conditioning, and other techniques.

Voice/Data Server

In general, voice/data server 1016 may be functionally equivalent to voice/data server 500 (see FIG. 5). However, rather than process, monitor, and regulate call traffic in the context of conventional POTS signals transmitted over a number of twisted pair lines, voice/data server 1016 is configured to process, monitor, and regulate call traffic associated with a plurality of distinct frequency channels associated with digital data carried over at least one twisted pair. In this respect, voice/data server 1016 is preferably configured to generate digital telephony signals in accordance with a suitable wideband protocol that utilizes operating frequencies above 4 kHz. Although, in theory, voice/data server 1016 can be placed at any convenient location, practical limitations associated with the transmission of digital data over the existing POTS network may place restrictions on the location of voice/data server 1016. For example, due to the digital data transmission scheme utilized between voice/data server 1016 and enhanced wideband telephones 1014, 1006, the attenuation losses associated with digital transmissions may impose practical limitations on the physical distance between voice/data server 1016 and house 1004. In other words, if a conventional cooper analog loop is present in the telephone network, then it may not be efficient or practical to have voice/data server 1016 located in a remote location relative to house 1004. Of course, if alternate local loop transmission schemes are used, or if improved digital data communication techniques are developed, then system 1000 may be more insensitive to the distance between voice/data server 1016 and house 1004.

Figure 12:
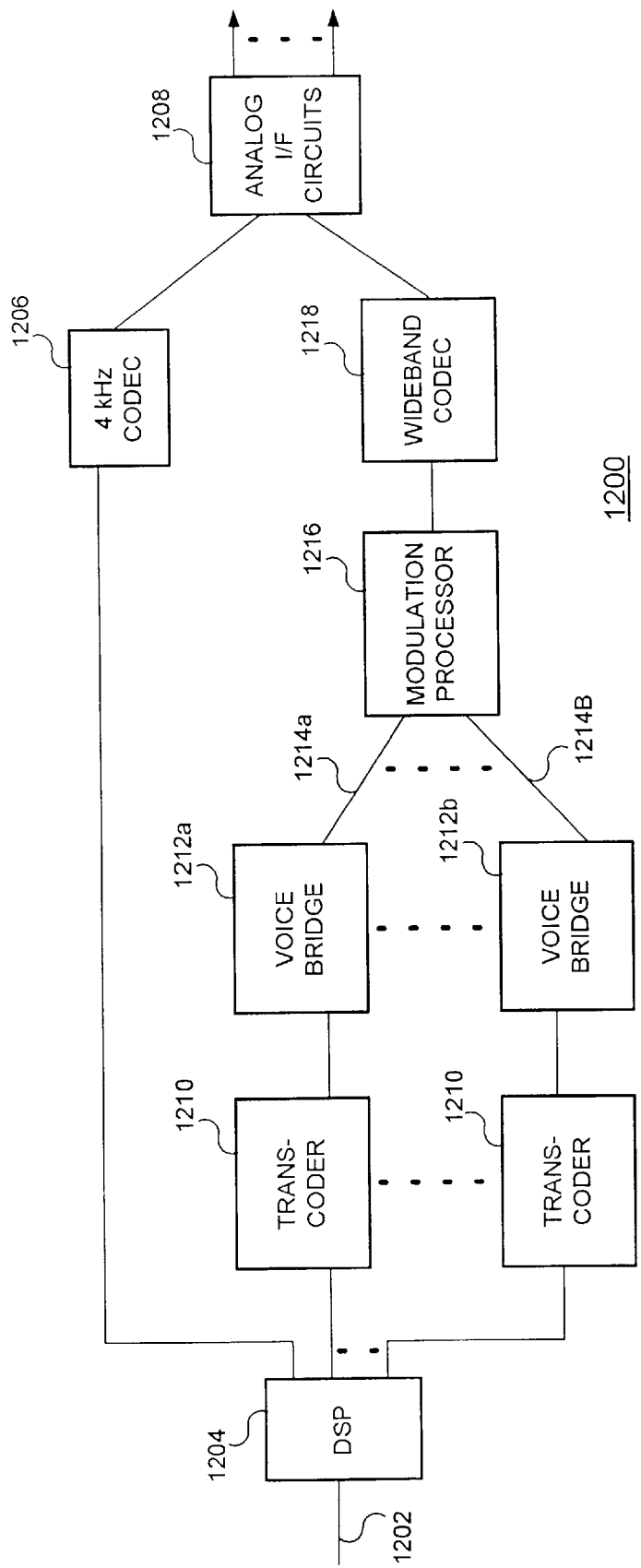
FIG. 12 is a block diagram representation of an exemplary voice interface that may be used by the voice/data server shown in FIG. 10.

FIG. 12 is a block diagram representation of a typical voice interface 1200 that may be employed in the context of a wideband embodiment of the present invention. Voice interface 506 may be configured similar to voice interface 1200 for compatibility with the wideband embodiment described herein. Voice interface 1200 is further configured to support the 4 kHz embodiment described above (see FIG. 6 and the accompanying description of voice interface 600). The input 1202 to voice interface 1200 is connected (directly or indirectly) with processing element 504 (see FIG. 5). Voice interface 1200 may include a multiprocessing DSP 1204 that is configured to implement speech coding and fax/data modem modulation. DSP 1204 may also be capable of carrying out any number of functions normally associated with 4 kHz telephony signal processing. For compatibility with conventional POTS transmissions (and for compatibility with the enhanced 4 kHz embodiment described above), voice interface 1200 may also include a 4 kHz CODEC element 1206, which is configured to support any number of distinct POTS lines. Indeed, 4 kHz CODEC element 1206 may include any number of functionally independent CODEC elements, as shown in FIG. 6. The output (or outputs) of 4 kHz CODEC element 1206 are eventually routed to an analog I/F circuit component 1208, which may incorporate the functionality of analog I/F circuits 608.

DSP 1204 generates a number of output signals associated with a number of transcoders 1210. Transcoders 1210 are utilized as necessary to change the speech coding technique associated with incoming telephony signals. This may occur if the coding scheme utilized by the enhanced wideband telephone (e.g., in accordance with the G.711 or G.722 protocol) is different than that required by the telephone network for the particular call (e.g., in accordance with the G.729 protocol). The illustrated embodiment employs one transcoder 1210 for each enhanced wideband telephone serviced by voice/data server 1016. Of course, in a practical embodiment, the various transcoders 1210 may be realized in a single integrated circuit chip or they may be implemented within DSP 1204. Each transcoder 1210 may be configured in accordance with conventional technologies. The operational details of transcoders are generally known to those skilled in the art and, therefore, transcoders 1210 will not be described in detail herein.

In the analog domain (e.g., conventional POTS systems), a plurality of voice signals from different telephone devices are inherently mixed onto a single line. However, in the digital domain, the mixing of separate digital signals is not as straightforward. Accordingly, voice interface 1200 may also include any number of voice bridge components 1212 for use during conference calling. As shown, each voice bridge 1212 is functionally associated with one transcoder 1210. In a practical embodiment, voice bridge components 1212 and transcoders 1210 may be implemented in a single integrated circuit component, such as a DSP. Voice bridge components 1212 may be configured in accordance with conventional digital audio bridging techniques; such known techniques will not be described in detail herein.

Ideally, the input/output 1214 associated with each bridge component 1212 represents one receive channel from each enhanced wideband telephone and one transmit channel to a specific enhanced wideband telephone. In practice, it may not be necessary to have each voice bridge support all of the enhanced wideband telephones at the same time due to the low probability that a large number of users will participate in a simultaneous call. Accordingly, it may be reasonable to limit the voice bridge functionality such that each voice bridge 1212 is capable of supporting only a small number of enhanced wideband telephones (e.g., three) in addition to the called party.

If, for example, a user of enhanced wideband telephone 1014 wishes to participate in an existing call with a user of enhanced wideband telephone 1006 (see FIG. 10), the user of telephone 1014 will select the same "line" as the user of telephone 1006 and then voice interface 1200 may process the call in the following manner. Voice bridge 1212a may receive the voice signal transmitted from enhanced wideband telephone 1014 over channel one ("CH1") and the voice signal transmitted from enhanced wideband telephone 1006 over CH2. These two distinct signals are processed and digitally mixed by voice bridge 1212a such that the mixed signals can be transmitted back to the two users on the channel representing the "line" both users are logically connected to.

In accordance with an alternate methodology, a particular voice bridge 1212 may be logically "inserted" into a conference call in the following manner. Initially, when an enhanced wideband telephone goes off-hook, it signals the voice/data server and identifies which "line" is currently in use. Thereafter, when the voice/data server detects that another enhanced wideband telephone is off-hook on the same line, then one of the logical voice bridges 1212 may be inserted into the current line (or otherwise implemented for use in connection with the current line) to facilitate the conference call.

Voice interface 1200 may also include a modulation processor 1216, which may be operationally associated with voice bridge components 1212. Modulation processor 1216 is configured to receive downstream digital signals from voice bridge components 1212, directly from DSP 1204, or directly from transcoders 1210, depending upon the particular application and/or depending upon the current operating conditions of system 1000. Modulation processor 1216 may be configured to perform one or more digital modulation schemes such that the digital data received by voice/data server 1016 is suitably modulated for transmission over the selected channel. As described above, modulation processor 1216 may employ any number of digital modulation schemes, such as QAM. Alternatively, modulation processor 1216 may utilize the Home PNA technique (in such a configuration, modulation processor 1216 may have an additional input representing the data path to and from the data portion of the system. Modulation processor 1216 may employ any number of conventional digital data communication techniques. For example, a number of modulation techniques, along with other well known techniques that may be utilized in the context of the present invention, are described in Lee & Messerschmitt, DIGITAL COMMUNICATION (2d ed. 1996), the contents of which are incorporated herein by reference.

The input/output of modulation processor 1216 is coupled (directly or indirectly) to a wideband CODEC 1218. CODEC 1218 is preferably configured to facilitate data coding and decoding in accordance with the specific encoding scheme employed by system 1000. In simple terms, CODEC 1218 converts the analog modem signal on the wire to digital. For the A/D portion, CODEC 1218 samples the analog signal at a suitable sampling rate depending upon the frequency range and the bandwidth. For the D/A portion, CODEC 1218 converts digital bits to an analog signal. In a practical embodiment, the decoding of the modulation is performed by modulation processor 1216. In addition, CODEC 1218 may be configured to extract the channels associated with calls placed to the enhanced wideband telephones. The output of CODEC 1218 is routed to analog I/F circuit component 1208 such that twisted pair 1002 (see FIG. 10) can be driven in an appropriate manner to deliver the modulated digital data to enhanced telephones 1014, 1006. As described above, analog I/F circuit component 1208 provides over voltage protection, provides line voltage/current, generates ringing signals, and detects on-hook and off-hook conditions associated with the telephone and fax devices.

Signaling

As described above, voice/data server 1016 and enhanced wideband telephone 1100 are preferably capable of communicating control, supervisory, status, and other data (i.e., signaling information) via the 8 kHz channels (or channel) associated with the specific call. In the context of system 1000, the wideband signaling procedure operates within the designated operating band, e.g., band 404 (see FIG. 4). Accordingly, conventional telephones, conventional fax machines, and enhanced 4 kHz telephony devices are not affected by the wideband signaling. As described above, the wideband embodiment employs a digital data modulation scheme; this scheme facilitates the embedding of signaling data along with the information data. In other words, in the digital domain, the signaling data can be formatted, transmitted, received, and extracted in accordance with known digital modulation techniques.

In the wideband embodiment, signaling element 1112 (associated with enhanced telephone 1100) and signaling element 518 (associated with voice/data server 500) are configured in a compatible manner such that the signaling information, once demodulated, can be suitably interpreted. Accordingly, signaling element 1112 may be configured to format the digital signaling data such that transmitter/receiver 1114 can subsequently process the data for transmission to voice/data server 1016. Similarly, signaling element 518 may be configured to format the digital signaling data such that voice interface 506 can subsequently process the data for transmission to the enhanced wideband telephones. The specific format of the signaling data, and the manner in which the signaling data is generated, received, and processed, may vary from application to application. Indeed any number of prior art framing, flagging, error coding, and other data communication techniques may be used in this context.

In a practical embodiment, 256 point QAM may be employed for purposes of transmitting the digital data between voice/data server 1016 and the enhanced telephones 1014, 1006. Such a modulation scheme provides a theoretical data rate of 64 kbps. However, an exemplary embodiment may employ more than 256 QAM symbols, e.g., 280 symbols, to facilitate the transmission of the signaling data. The additional symbols may be desirable to obtain an additional 100–300 bps, which should be more than adequate for the type of signaling information that will be communicated in a practical system.

Incoming Call Processing

Referring to FIGS. 5, 10, and 11, the wideband signaling procedure may be employed to enable system 1000 to provide and distribute the enhanced telephony services described above. In many respects, the functionality of system 1000 is identical or equivalent to the functionality of system 200 described above in connection with FIG. 2. Accordingly, the description of many common features will not be repeated in the context of the wideband embodiment. Again, for illustrative purposes, assume that system 1000 supports four telephone numbers (111-1111, 222-2222, 333-3333, and 444-4444) on a single twisted pair. Furthermore, assume that each of the telephone numbers is associated with a different telephony instrument. Accordingly, this exemplary environment utilizes four upstream channels and four downstream channels (or four echo-canceled channels).

It should be appreciated that, in a practical system, any given telephone number may be related to one or more different enhanced wideband telephone or fax devices. Generally, the number of downstream channels is associated with the number of supported telephone numbers while the number of upstream channels is associated with the number of enhanced wideband telephone devices utilized in the premises. In a practical operating environment, the number of downstream channels will equal the telephone number count and the number of upstream channels will equal the number of wideband telephone devices. Thus, if two enhanced wideband telephone instruments support four telephone numbers, then there will be two upstream and four downstream channels. If there are six enhanced wideband devices, then there will be six upstream and four downstream channels. If echo canceled channels are employed, the number of echo canceled channels will be associated with the number of enhanced wideband telephone devices utilized in the premises.

In one preferred embodiment, voice/data server 1016 and enhanced wideband telephones 1014, 1006 continuously communicate supervisory data by way of the modulated signaling information, whether or not the telephony devices are active. For example, voice/data server 1016 may transmit status information on any number of supervisory channels. Thus, each enhanced wideband telephone 1014, 1006 may monitor a single supervisory channel (or each may monitor a different supervisory channel) that contains data associated with the status of other channels, other enhanced wideband telephone devices, or the like. From the perspective of the enhanced wideband telephones 1014, 1006, the status bits are updated whether or not voice or information data is being transmitted. The status information may indicate whether a particular enhanced wideband telephony device is busy, inactive, or ringing. The status information may also indicate which channels are currently in use and the enhanced wideband telephones 1014, 1006 utilizing such channels (telephones 1014, 1006 may be identified by their respective telephone numbers).

In an exemplary practical embodiment, all enhanced wideband telephony devices are provided with status information regarding all of the enhanced lines associated with the premises. For example, each downstream channel may be utilized to carry system status information to the enhanced wideband devices. Accordingly, each enhanced wideband instrument can monitor any one of the downstream channels to determine the current operating status of any line. Alternatively, the system may utilize a common supervisory channel. For example, if CH8 is utilized as the supervisory channel, all of the enhanced wideband telephony devices can monitor the signaling information even if CH8 is also being used to convey voice information to one or more enhanced wideband telephones 1014, 1006.

Enhanced wideband telephones 1014, 1006 may respond to the status information in any number of ways. For example, each enhanced wideband telephone 1014, 1006 may use lighted buttons or any identification scheme to identify the current status of each of the four channels, which are functionally equivalent to four POTS twisted pair lines. Accordingly, the user can view enhanced wideband telephone 1006 to obtain the status of all four lines even though telephone 1006 is only monitoring a single channel. In response to a change in the status of, e.g., enhanced wideband telephone 1006, the associated upstream signaling channel will be used to convey the updated status information to voice/data server 1016.

In response to an incoming call directed to, e.g., telephone number 222-2222, voice/data server 1016 may suitably select or identify the downstream channel for the current call. In addition, signaling element 518 (see FIG. 5) generates suitably formatted signaling data for transmission on the single twisted pair 1002 using the status channels (or the supervisory channel). The signaling data transmitted by voice/data server 1016 may suitably convey a channel identifier so that enhanced telephones 1014, 1006 can be conditioned to receive data on the downstream channel. In addition, the signaling data may indicate a "line" associated with the current call. As shown in FIG. 10, enhanced telephones 1014, 1006 may include buttons, lights, a display, or any suitable indicia for indicating and/or selecting the active "line" associated with the current call. For example, if the signaling data from voice/data server 1016 indicates that only enhanced wideband telephone 1014 is to ring, then enhanced wideband telephone 1006 will remain silent without any indication of an incoming call. However, enhanced wideband telephone 1014 will ring (or otherwise alert the user) and identify to the user that a particular "line" should be selected to complete the call. For example, telephone 1014 may display a flashing light for "LINE ONE" such that the user is prompted to engage an appropriate button or switch on the user interface 1102 (see FIG. 11). Alternatively, telephone 1014 may be configured to automatically select the ringing line when the handset goes off-hook. Indeed, even if multiple lines are ringing simultaneously, telephone 1014 may be configured to select lines in a specific order, e.g., always select a default line or follow a predetermined selection priority.

As described above, each of the enhanced wideband telephones 1014, 1006 may be configured such that they can monitor the twisted pair line and "listen" for signaling data. Accordingly, each of the enhanced wideband telephones 1014, 1006 receives the calling party identification signal and processes the signaling data in a suitable manner. If an enhanced wideband telephone 1014, 1006 detects a ring instruction, then it will ring in response to the instruction. The enhanced wideband telephone 1014, 1016 may be configured to generate its own ring signal or it may be configured to respond to a subsequent ring signal generated by voice/data server 1016 or any suitable system component. In contrast, any conventional telephones (not shown in FIG. 10) connected to twisted pair 1002 will ignore the signaling data and will ring in response to any ring signal present on twisted pair 1002.

Outgoing Call Processing

In the wideband embodiment, each of the enhanced telephony devices also includes the additional functionality associated with outgoing calls. The above description of the outgoing call processing for the enhanced 4 kHz embodiment applies in an equivalent manner to the wideband embodiment. In addition to the identification of the enhanced wideband telephony device that initiates the outgoing call, signaling element 1112 (see FIG. 11) may identify the upstream channel being used by the wideband telephony device. This calling party identification may be transmitted in response to a user's selection of one of a plurality of inactive "lines" over which to place an outgoing call. In practice, the selection of an available "line" in the wideband embodiment is associated with the selection of the upstream channel for the particular enhanced wideband telephone device. Accordingly, when the enhanced wideband telephone device is placed off-hook and the user indicates a particular line to use, the device transmits, in its upstream channel, information regarding the identification of the off-hook line. In addition, the user may also have the ability to select an active "line" for participation in a conference call (as described above in connection with the voice bridging feature of voice interface 1200.

Assuming the user selects an available channel, then the signaling data may identify the selected line to voice/data server 1016 (along with the calling device identifier) such that voice/data server 1016 can process the call in an appropriate manner, update its call/ring mapping element, and/or update its call traffic monitor. It should be appreciated that enhanced telephones 1014, 1006 may be further configured to automatically select an available channel and display an appropriate "line in use" in response to an off-hook condition (rather than stay dormant pending a line selection by the user).

It should be appreciated that processor 1104 (associated with enhanced wideband telephone 1100) can be of relatively modest power, relative to the processing power associated with voice/data server 1016. For example, telephone 1100 may be configured such that it only transmits on one channel at a time. Indeed, telephone 1100 and system 1000 may be configured such that telephone 1100 only transmits data (including signaling data) when it is in an off-hook condition. In contrast, voice/data server 1016 may be required to monitor all of the channels, process data associated with all of the channels, and transmit signaling data over all of the channels (in the worst case scenario).

Due to the DMT techniques employed by system 1000, the "active" status of the physical twisted pair 1002 is immaterial to whether or not a given enhanced wideband telephone 1 014, 1006 can place an outgoing call. However, the ability to place outgoing calls may be limited by other factors, such as the availability of transmit channels (the use of 50–100 channels ensures that any practical application will not simultaneously use all of the available channels). Furthermore, because the signaling information is conveyed in the digital domain, users of system 1000 will not detect any audible artifacts associated with the wideband signaling procedure.

It should be appreciated that system 1000 may be operated such that the telecommunication devices in house 1004 are divorced from the physical conductors (e.g., twisted pairs) connected thereto. In other words, system 1000 can support any number of different telephone numbers, and distribute calls placed to those telephone numbers, on a single twisted pair conductor. In addition, the enhanced wideband system 1000 can simultaneously support a large number of different telephone and fax numbers with the single twisted pair 1002. Although system 1000 has been described in conjunction with a single twisted pair 1002, the wideband concepts can be extended to a practical system having any number of twisted pairs servicing any number of telephony devices. In addition, the multiple-line wiring scheme described above in connection with system 200 and in connection with FIG. 7 may be used in wideband system 1000.

Other Wideband Applications

Referring again to FIG. 10, system 1000 may be further configured to support a conventional fax machine 1020; enhanced fax machines that include the functionality of the enhanced telephones may be compatible with system 1000. The above description of fax machine 822 and the procedures associated with incoming and outgoing fax calls (see FIG. 8) may be equivalently applied in the context of fax machine 1020; the significant differences relate to the use of wideband digital modulation by system 1000 for signaling and data transmission. To support fax communications, system 1000 may include a fax interface device 1022 configured to operate in a manner equivalent to fax interface device 820. For example, fax interface device 1022 is preferably configured to generate a one-way ring signal to alert fax machine 1020 of an incoming fax call. As described above, fax interface device 1022 may also be configured to generate a signaling message that indicates to voice/data server 1016 that an outgoing call is a fax call.

System 1000 may also support any number of legacy telephones 1024 in a manner that enables legacy telephones 1024 to emulate an enhanced wideband telephone. As described above in connection with FIG. 8, conventional telephone 1024 may be connected to jack 1012 via a telephone interface device 1026. Telephone interface device 1026 preferably contains the components and functionality associated with enhanced wideband telephone 1100 (described above in the context of FIG. 11). Telephone interface device 1026 is capable of performing ring control, signaling, channel selection, and other enhanced wideband features to enable the user to easily monitor the different "lines" throughout house 1004 and to enable the user to easily select a "line" for placing an outgoing call or for joining a conference call.

The cordless telephone features described above in connection with FIG. 9 can also be applied in the context of wideband system 1000. In theory, the functionality of cordless base station 912 may be incorporated into voice/data server 902. However, a more practical solution is depicted in FIG. 9. In the context of wideband system 1000, base station 912 may function in the same manner as a plurality of enhanced wideband telephones (four in the exemplary embodiment shown). In other words, base station 912 is capable of accessing multiple channels within the 200 kHz–1 MHZ band and to transmit on multiple channels to the various cordless handsets. As described previously, the individual cordless handsets 914, 916, 918, 920 may communicate with base station 912 over different channels within the RF spectrum (e.g., 900 MHZ, 2.4 GHz, or the like).

For compatibility with system 1000, base station 912 is configured to support the enhanced wideband features described above in connection with enhanced telephone 100. For example, voice/data server 902 and base station 912 preferably perform the wideband signaling procedures to initiate calls, monitor the status of the cordless handsets, and regulate the call traffic associated with the cordless handsets. The general procedures described above for incoming and outgoing cordless telephone calls may be performed in an equivalent manner by system 1000.

Wideband system 1000 may be flexibly configured to contemplate unconventional telephony devices and telephony devices that have not yet been fully developed or commercialized. For example, although the embodiment described herein utilizes 8 kHz channels for communicating digital data between voice/data server 1016 and the enhanced telephony instruments, the present invention is not so limited. Indeed, system 1000 may employ any number of channels having wider bandwidths to support applications that require a bit rate that exceeds 64 kbps. Alternatively, system 1000 may be configured to dynamically combine a plurality of channels to obtain a desired bit rate.

For example, if a videophone requires 384 kbps to operate, then system 1000 may allocate a suitable amount of bandwidth (if available) such that an appropriate videophone call may be established. System 1000 may employ any number of conventional multiplexing and digital data processing techniques to accomplish such dynamic bandwidth allocation. For example, system 1000 may utilize different modulation techniques having varying complexities depending upon the type of communication being supported, the number of channels needed, and other operational parameters of system 1000.

Figure 13:
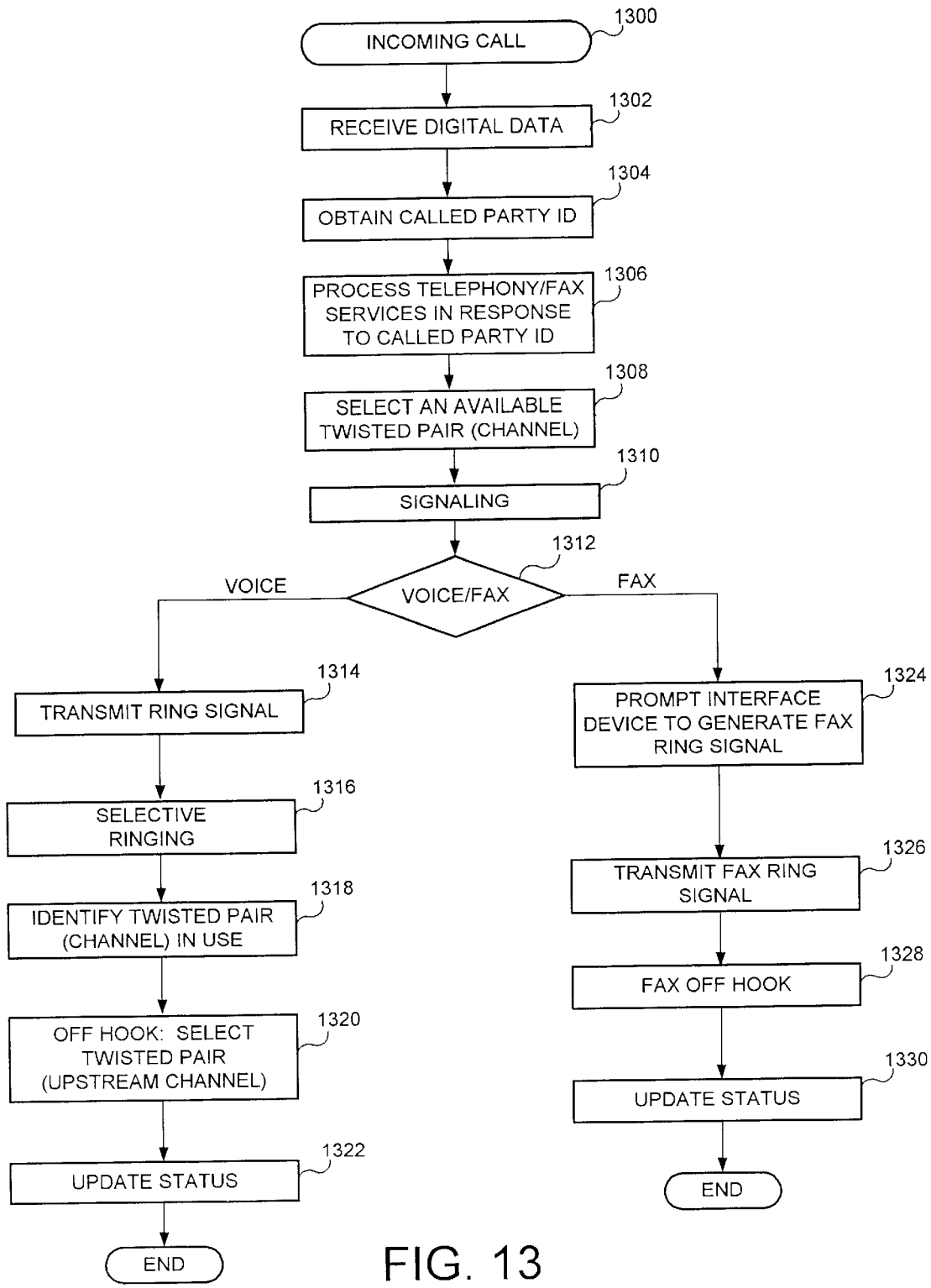
FIG. 13 is a flow diagram of an exemplary incoming call process according to the present invention.

FIG. 13 is a flow diagram of an exemplary incoming call process 1300 that may be performed by an enhanced telephony services distribution system. Process 1300 is described herein in general terms that are applicable to both the 4 kHz and wideband embodiments; FIG. 2 and FIG. 10, and the corresponding description of system 200 and system 1000, should be referred to for additional details. It should be noted that the various tasks associated with process 1300 (and the other processes described herein) may be performed in a different order than that described herein. In addition, a practical system may perform any number of additional or alternative tasks during the processing of an actual call. Process 1300 is merely illustrative of the exemplary procedures associated with one particular incoming call.

Incoming call process 1300 may begin with a task 1302, during which the voice/data server receives digital data in accordance with a suitable digital data communication protocol, such as ADSL, ISDN, or the like. The received digital data conveys the information associated with the incoming call. Following task 1302, a task 1304 is performed by the voice/data server to obtain or extract the called party identification associated with the incoming call. In this context, the called party identification may be the called party telephone number.

Next, a task 1306 may be performed to process the telephony or fax services in response to the called party identification. As described above, the voice/data server may include a call mapping feature that contains call restrictions and/or a ring map associated with the enhanced telephony devices supported by the system. Task 1306 may cause the voice/data server to perform any number of telephony services such as voice mail, distinctive ringing, caller identification, or the like, in response to the called party identification (and possibly in response to the current status of the system). Assuming that the voice/data server will attempt to establish a connection for the incoming call, a task 1308 may be prompted.

Task 1308, which may be performed by the voice/data server, selects an available twisted pair (in the 4 kHz embodiment) or an available transmission channel (in the wideband embodiment) over which the incoming call will be transmitted. As described in detail above, the 4 kHz embodiment may select a physical twisted pair line, while the wideband embodiment may select one of a plurality of discrete channels (and possibly a physical twisted pair line over which the modulated digital data will be transmitted). In addition to task 1308, a task 1310 may be performed by the voice/data server; portions of task 1310 may be associated with the functionality resident at the enhanced telephone devices. During task 1310, the voice/data server and the enhanced devices carry out the different signaling procedures described above (e.g., line/channel monitoring, status updating, called party identification, ring control, incoming line/channel identification, and the like). It should be appreciated that some signaling may be continuously or periodically performed during incoming call process 1300 and during idle periods associated with the enhanced telephony system.

A query task 1312 may be performed by the voice/data server to determine whether the incoming call is directed to a voice telephone or a fax machine. Query task 1312 may be incorporated into task 1306, during which the called party identification may be compared to a suitable look-up table listing the supported telephone and fax numbers. Query task 1312 may be implemented if the system treats incoming voice and fax calls differently.

If query task 1312 determines that the incoming call is directed to a voice telephone, then a task 1314 is performed. Task 1314 causes the voice/data server to transmit an appropriate ring signal associated with the selected line. Next, a task 1316 may be performed such that the various telephone devices are selectively rung. As described above, the signaling procedures carried out prior to task 1316 condition the enhanced telephone devices to either ignore or respond to the ring signal. Thus, only those enhanced telephones (or those legacy telephones connected to a suitable enhanced telephone interface device) that have been conditioned to ring will be selectively rung. The selective ringing may be accompanied with a distinctive ring tone or ring pattern to further identify the recipient of the incoming call.

Assuming that an enhanced telephone properly receives the ring signal, that enhanced telephone will perform a task 1318. During task 1318, the ringing telephone suitably identifies the line associated with the incoming call. In technical terms, task 1318 identifies the twisted pair (4 kHz embodiment) or the channel (wideband embodiment) currently in use by the system. In response to an off-hook condition at the ringing telephone, a task 1320 may be preformed to select the incoming line such that upstream communication can be established. In the context of the 4 kHz embodiment, task 1320 may physically select one of a plurality of twisted pair lines associated with both the upstream and downstream signals. In the context of the wideband embodiment, task 1320 may select a suitable upstream channel (different than the downstream channel) for use with the current "line" (in the alternate wideband embodiment, task 1320 may simply confirm and select the single full-duplex channel for use with both upstream and downstream transmissions).

A task 1322 may be performed in response to the off-hook condition at the enhanced telephone to suitably update the current status of the system. As described above, signaling information may be exchanged during task 1322 to inform the voice/data server of the active status of the particular enhanced telephone and/or to confirm which upstream channel has been selected by the telephone. Following task 1322, incoming call process 1300 ends.

If query task 1312 determines that the incoming call is a fax call, then a task 1324 is initiated (rather than task 1314). Task 1324 prompts the fax interface device to generate a one-way fax ring signal, as described above. Task 1324 may be a by-product of the signaling performed during task 1310. For example, if the signaling data contains a fax call identifier, then the fax interface device may automatically perform task 1324. Following task 1324, the fax interrace device preferably transmits or otherwise generates the one-way fax ring signal during a task 1326 such that the associated fax machine rings (the fax machine may only ring in an internal manner).

In response to the fax ring signal, a task 1328 may be performed by the fax machine to place the fax machine in an off-hook state. In addition, task 1328 may prompt the fax machine to generate a conventional answer tone or to otherwise initialize the fax transmission. After the fax machine goes off-hook, a task 1330 may be performed by the fax interface device to suitably update the current status of the system. As described above in connection with task 1322, the signaling protocols may be employed to update the current status of the system. Following task 1330, incoming call process 1300 ends.

Figure 14:
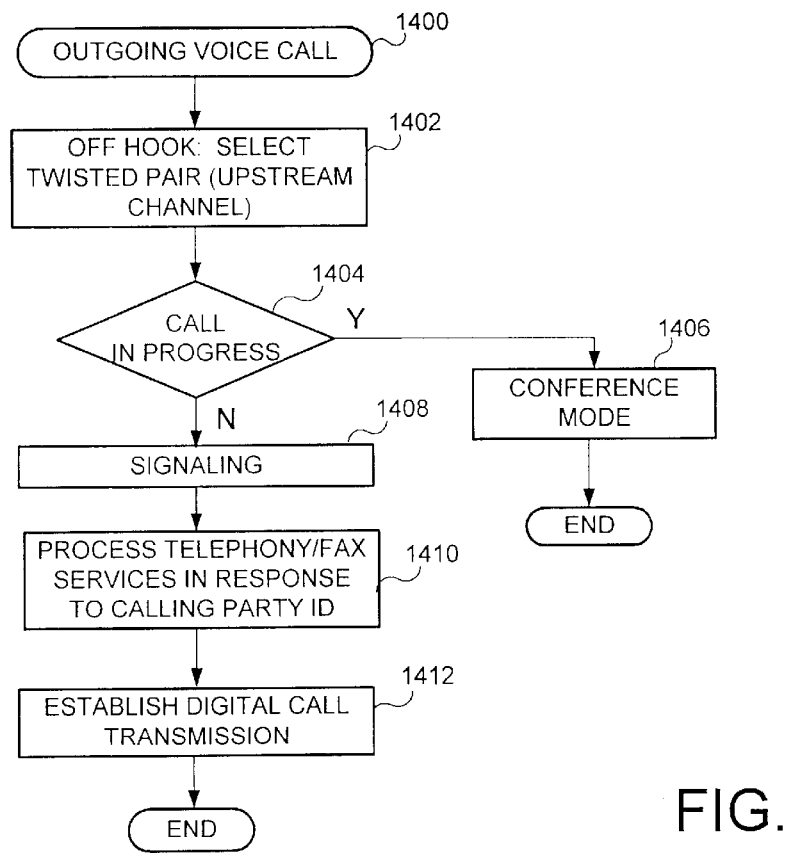
FIG. 14 is a flow diagram of an exemplary outgoing voice call process according to the present invention.

Referring now to FIG. 14, an outgoing voice call process 1400 is depicted as a flow diagram. Process 1400 is generalized such that it may apply to both the 4 kHz and wideband embodiments of the present invention. Process 1400 begins with a task 1402, which is performed in response to an off-hook condition at an enhanced telephone. Task 1402 causes the enhanced telephone to suitably select a twisted pair (4 kHz embodiment) or an upstream channel (wideband embodiment) for the outgoing call. In one exemplary embodiment, the enhanced telephone may be associated with an "assigned" upstream channel that is used regardless of which downstream channel is selected. Accordingly, the enhanced telephone may also select a downstream channel for use with the current call. Task 1402 may be responsive a user input at the enhanced telephone. Following task 1402 the user may enter the dialing sequence associated with the outgoing call. Next, a query task 1404 may be performed.

Query task 1404 determines whether a call is in progress on the selected line. If query task 1404 determines that a call is already in progress, then a task 1406 may cause the system to enter a conference call mode such that the user is able to join the existing call. In addition, the system may update its status to reflect the addition of the third party to the existing call. If query task determines that a call is not in progress, i.e., the selected line is available, then a task 1408 may be prompted.

Task 1408 causes the enhanced telephone to generate and transmit signaling data to the voice/data server. The signaling data may be transmitted over the selected twisted pair (4 kHz embodiment), over the selected upstream channel (wideband embodiment), or over a designated supervisory channel (wideband embodiment). The signaling data may include an identification of the enhanced telephone placing the call, an identification of the line in use, an identification of the called number, or the like. In response to the signaling data, a task 1410 may be performed by the voice/data server. During task 1410, the voice/data server may process the enhanced telephony services in response to the calling party identification. As described above, task 1410 may restrict the time during which outgoing calls may be placed from a given enhanced telephone, limit the number of Outgoing calls associated with a given enhanced telephone, or prevent outgoing calls directed to certain telephone numbers.

Assuming that task 1410 authorizes the current outgoing call, a task 1412 may be performed by the voice/data server. Task 1412 establishes a digital call transmission with the telephone network for the current outgoing call. The voice/data server may also confirm the downstream line associated with the current call such that it may effectively communicate with the enhanced telephone. Following task 1412, outgoing voice call process 1400 ends.

Figure 15:
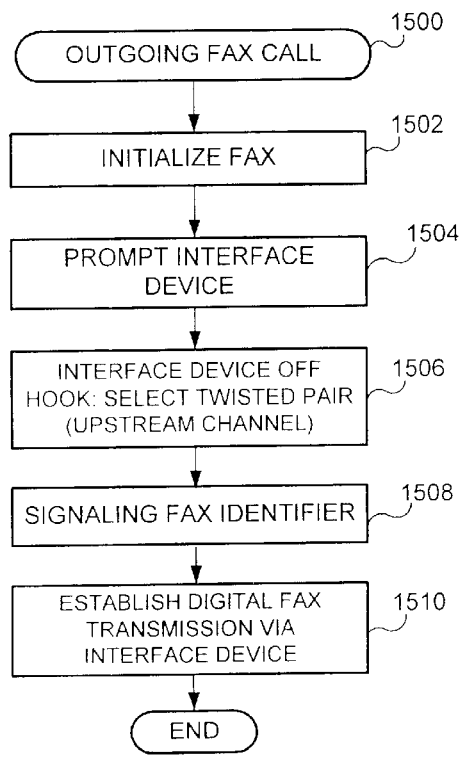
FIG. 15 is a flow diagram of an exemplary outgoing fax call process according to the present invention.

Referring now to FIG. 15, an outgoing fax call process 1500 is depicted as a flow diagram. Process 1500 is described herein in the context of a conventional fax machine. Process 1500 is generalized such that it may apply to both the 4 kHz and wideband embodiments of the present invention. Process 1500 begins with a task 1502, which is performed in response to a user entry at the fax machine. Task 1502 causes the fax machine to initialize a fax transmission by causing the fax machine to go off-hook. During a task 1504, the fax machine may prompt the fax interface device in any suitable manner (in the context of a conventional fax machine, the prompting will be associated with the off-hook condition itself). For example, the fax machine may transmit conventional initialization tones or data to the fax interface device; the fax interface device is preferably configured to recognize and respond to such prompting from the fax machine.

In response to the initialization of the fax machine, a task 1506 is performed. During task 1506, the fax interface device goes off-hook and selects an available "line" (i.e., a twisted pair in the 4 kHz embodiment or a downstream channel in the wideband embodiment) for subsequent transmission. A task 1508 is performed to cause the fax interface device to generate and transmit signaling data to the voice/data server. The signaling data may be transmitted over the selected twisted pair (4 kHz embodiment), over the upstream channel (wideband embodiment), or over a designated supervisory channel (wideband embodiment). The signaling data is suitably formatted to identify that the outgoing call is a fax call. In addition, the signaling information may include an identification of the line in use, an identification of the called number, or the like, to enable the system to suitably update its current status. The voice/data server may process any number of telephony services in response to the outgoing fax call request, as described in detail above.

Assuming that the voice/data server authorizes the current outgoing fax call, a task 1510 may be performed by the voice/data server. Task 1510 establishes a digital fax transmission with the telephone network via the fax interface device. In the wideband embodiment, the voice/data server may maintain its supervisory signaling channel with the fax interface device. Following task 1510, outgoing voice call process 1400 ends.

In summary, an improved technique for providing telephony services to the customer premises may be carried out in the context of a system based on the 4 kHz POTS spectrum or in the context of a wideband system. The improved telephony techniques described herein can be implemented in existing customer premises without having to overhaul the existing telephone wiring infrastructure within the premises. An advantage of the enhanced telephony systems is that they can support a plurality of telephone numbers even though the customer premises may only be supported by a single twisted pair.

In practical embodiments, the enhanced telephony equipment according to the present invention is fully compatible with conventional POTS telephony equipment. In addition, the operating procedures associated with the enhanced system (e.g., placing calls, joining a call with an extension telephone, dialing, and the like) are identical or substantially similar to the procedures associated with the POTS scheme, thus preserving the familiar operating protocols known to most consumers.

The present invention has been described above with reference to preferred and exemplary embodiments. However, those skilled in the art will recognize that changes and modifications may be made to the embodiments described herein without departing from the scope of the present invention. For example, the exemplary frequency bands, channel assignments, channel bandwidths, and modulation schemes associated with the wideband embodiment may vary from system to system. In addition, the number of enhanced telephones, conventional telephones, fax machines, fax interface devices, and conventional telephone interface devices, may vary to suit the individual needs of the consumers and the environments described herein are merely exemplary. Furthermore, the enhanced wideband techniques are fully compatible with conventional POTS telephony devices and with enhanced 4 kHz telephony devices, and the different systems may be combined to any extent. These and other changes or modifications are intended to be included within the scope of the present invention, as expressed in the following claims.

What is claimed is:

1. A server for use to support a first telephone number and a second telephone number over a single twisted pair coupled to both a first device and a second device operating in 4 KHz POTS bandwidth, said first device being configured to support said first telephone number and said second device being configured to support said second telephone number, said server comprising:

a call mapping element configured to receive a telephone call and map said telephone call to one of said first telephone number and said second telephone number; and a signaling element configured to transmit a signal to said first device and said second device over said single twisted pair within 4 KHz POTS bandwidth;

wherein said signal includes information indicative of said one of said first telephone number and said second telephone number.

2. The server of claim 1, wherein said call mapping elements maps said telephone call to said first telephone number, wherein said first device obtains said information from said signal and generates a ring in response to said information, and wherein said second device obtains said information from said signal and ignores said information.

3. The server of claim 1, wherein said signal is a V.21 signal.

4. The server of claim 1 further comprising a memory in communication with said call mapping element, wherein said memory includes telephone number information relating to each of said telephone numbers, and wherein said telephone number information includes call restriction parameters.

5. The server of claim 4, wherein said call restriction parameters indicate the times during which each of said telephone numbers can place or receive calls.

6. The server of claim 4, wherein said call restriction parameters indicate one or more devices designated to ring in response to said telephone call.

7. The server for use to support a first telephone number and a second telephone number over a single twisted pair coupled to both a first device and a second device operating in 4 KHz POTS bandwidth, said first device being configured to support said first telephone number and said second device being configured to support said second telephone number, said server comprising:

a signaling element configured to receive a signal from one of said first device and said second device over said single twisted pair within 4 KHz POTS bandwidth, said signal including information indicative of said one of said first device and said second device; and a call mapping element configured to receive said information from said signaling element and map one of said first telephone number and said second telephone number to said one of said first device and said second device.

8. The server of claim 7, wherein said call mapping elements maps said first telephone number to said first device based on said signal.

9. The server of claim 7, wherein said signal is a V.21 signal.

10. The server of claim 7 further comprising a memory in communication with said call mapping element, wherein said memory includes telephone number information relating to each of said telephone numbers, and wherein said telephone number information includes call restriction parameters.

11. The server of claim 10, wherein said call restriction parameters indicate the times during which each of said telephone numbers can place or receive calls.

12. A server for use to support a plurality of telephone numbers over a single twisted pair coupled to a plurality of telephony devices operating in 4 KHz POTS bandwidth, said server comprising:

a signaling element configured to receive a signal within 4 KHz POTS bandwidth from one of said plurality of telephony devices, said signal including information indicative of said one of said plurality of telephony devices; and a call mapping element configured to receive said information from said signaling element and map an available one of said plurality of telephone numbers to said one of said telephony plurality of devices.

13. The server of claim 12, wherein said channels are supported by a discrete multi-tone technique.

14. The server of claim 12 further comprising a memory in communication with said call mapping element, wherein said memory includes device information relating to each of said telephony devices, and wherein said device information includes call restriction parameters.

15. The server of claim 14, wherein said call restriction parameters indicate the times during which each of said telephony devices can place or receive calls.

16. A method of supporting a first telephone number and a second telephone number over a single twisted pair coupled to both a first device and a second device operating in 4 KHz POTS bandwidth, said first device being configured to support said first telephone number and said second device being configured to support said second telephone number, said method comprising:

receiving a telephone call;

mapping said telephone call to one of said first telephone number and said second telephone number; and transmitting a signal to said first device and said second device over said single twisted pair within 4 KHz POTS bandwidth;

wherein said signal includes information indicative of said one of said first telephone number and said second telephone number.

17. The method of claim 16, wherein said mapping maps said telephone call to said first telephone number, and wherein said method further comprising:

obtaining said information by said first device from said signal;

generating a ring by said first device in response to said information, obtaining said information by said second device from said signal; and ignoring said information by said second device.

18. The method of claim 16, wherein said signal is a V.21 signal.

19. The method of claim 16, wherein said mapping is performed by a server having a memory in communication with said mapping, wherein said memory includes telephone number information relating to each of said telephone numbers, and wherein said telephone number information includes call restriction parameters.

20. The method of claim 19, wherein said call restriction parameters indicate the times during which each of said telephone numbers can place or receive calls.

21. The method of claim 20, wherein said call restriction parameters indicate one or more devices designated to ring in response to said telephone call.

* * * * *